(12) United States Patent
Terada et al.

(10) Patent No.: US 7,583,004 B2
(45) Date of Patent: Sep. 1, 2009

(54) SHORT-CIRCUITING MEMBER, COMMUTATOR, AND METHOD OF MANUFACTURING SHORT-CIRCUITING MEMBER

(75) Inventors: Yuuichi Terada, Hamamatsu (JP);
Toshihiro Tanino, Hamamatsu (JP);
Toshio Yamamoto, Kosai (JP);
Yasuhide Itou, Shizuoka-ken (JP);
Yoshiki Nakano, Hamamatsu (JP);
Ryohei Kageyama, Hamamatsu (JP)

(73) Assignee: ASMO Co., Ltd. (JP)

( * ) Notice: Subject to any disclaimer, the term of this patent is extended or adjusted under 35 U.S.C. 154(b) by 275 days.

(21) Appl. No.: 10/574,430

(22) PCT Filed: Oct. 5, 2004

(86) PCT No.: PCT/JP2004/014656

§ 371 (c)(1),
(2), (4) Date: Nov. 28, 2006

(87) PCT Pub. No.: WO2005/034315

PCT Pub. Date: Apr. 14, 2005

(65) Prior Publication Data

US 2007/0069603 A1    Mar. 29, 2007

(30) Foreign Application Priority Data

Oct. 6, 2003 (JP) .............................. 2003-346930

(51) Int. Cl.
*H02K 39/04* (2006.01)
(52) U.S. Cl. .................... 310/233; 310/234; 310/151
(58) Field of Classification Search ......... 310/127–151, 310/233–236, 225
See application file for complete search history.

(56) References Cited

U.S. PATENT DOCUMENTS

| 3,662,201 | A | * | 5/1972 | Madsen ...................... 310/220 |
| 4,876,472 | A |   | 10/1989 | Shiraki et al. |
| 6,057,623 | A | * | 5/2000 | Tanaka et al. ............... 310/206 |
| 6,057,626 | A |   | 5/2000 | Tanaka et al. |
| 6,181,046 | B1 |  | 1/2001 | Daikoku et al. |

(Continued)

FOREIGN PATENT DOCUMENTS

JP        48-13804        2/1973

(Continued)

*Primary Examiner*—Thanh Lam
(74) *Attorney, Agent, or Firm*—Carstens & Cahoon LLP

(57) ABSTRACT

A short-circuiting member for preventing a commutator from being elongated in the axial direction without increasing the types of different components. The short-circuiting member includes components, each having outer and inner circumferences. Each component includes outer circumference terminals arranged along the outer circumference, inner circumference terminals arranged along the inner circumference, and connection portions connecting a corresponding one of the outer circumference terminals and a corresponding one of the inner circumference terminals that are separated from each other by a predetermined angle in a circumferential direction. The outer and inner circumference terminals are substantially formed along the same plane. The components are laminated in a state in which the connection portions of one of the components are reversed to the connection portions of another one of the components. The outer circumference terminals that are adjacent in a lamination direction are in contact with each other, the inner circumference terminals that are adjacent in the lamination direction are in contact with each other, and the connection portions that are adjacent in the lamination direction are not in contact with each other.

12 Claims, 13 Drawing Sheets

U.S. PATENT DOCUMENTS

| | | | |
|---|---|---|---|
| 6,285,106 B1 * | 9/2001 | Oki | 310/233 |
| 6,320,293 B1 | 11/2001 | Yamada et al. | |
| 6,362,555 B1 * | 3/2002 | Katagiri et al. | 310/269 |
| 6,756,717 B2 * | 6/2004 | Yamamoto et al. | 310/225 |
| 6,819,025 B2 * | 11/2004 | Egawa et al. | 310/216 |
| 6,836,049 B2 * | 12/2004 | Terada et al. | 310/233 |
| 6,903,483 B2 * | 6/2005 | Yamamoto et al. | 310/233 |

FOREIGN PATENT DOCUMENTS

| | | |
|---|---|---|
| JP | 01-133551 | 5/1989 |
| JP | 2000-060073 | 2/2000 |
| JP | 2000-060077 | 2/2000 |
| JP | 2002-325405 | 11/2002 |
| JP | 2003-189547 | 7/2003 |
| JP | 2003-299288 | 10/2003 |

* cited by examiner

SHORT-CIRCUITING MEMBER, COMMUTATOR, AND METHOD OF MANUFACTURING SHORT-CIRCUITING MEMBER

FIELD OF THE INVENTION

The present invention relates to a commutator for a motor, and more particularly, to a short-circuiting member for short-circuiting predetermined segments of a commutator and a method for manufacturing a short-circuiting member.

BACKGROUND OF THE INVENTION

In conventional motors having power-feeding brushes, among a plurality of segments arranged in a commutator, predetermined segments may be short-circuited. When predetermined segments are short-circuited in such a motor, current flows through segments that are not in contact with power-feeding brushes. This reduces the quantity of power-feeding brushes that are required in a motor.

For example, with the structure described above in which predetermined segments are short-circuited, the predetermined segments are short-circuited by using a short-circuit wire or by bypassing a winding wire that is wound around a core.

A motor including an equalizer (short-circuiting member) and a commutator (main body) fixed to the equalizer in the axial direction of a rotor is known in the prior art (refer to, for example, Patent Publication No. 1). The commutator includes a plurality of segments, and the equalizer includes a large number of terminals and insulating plates that are alternately laminated in the axial direction for short-circuiting predetermined segments.

A commutator including different kinds of terminals that are embedded in insulators for short-circuiting predetermined segments (where each terminal is arranged at a different position in the axial direction) is also known (refer to, for example, Patent Publication 2).

However, when predetermined segments are short-circuited by using the wire such as the short-circuit wire as described above, space for accommodating the wire needs to be provided between the commutator (segments) and the armature core. The commutator (and the armature) including the wire accommodating space is elongated in the axial direction. Further, when predetermined segments are short-circuited by the equalizer (short-circuiting member), which includes many terminals and insulating plates that are alternately laminated, the equalizer is connected to the commutator (main body) in the axial direction. This elongates the commutator (and the armature), which includes the equalizer, in the axial direction. As a result, the motor is enlarged.

In a commutator including different types of terminals that are embedded in insulators for short-circuiting predetermined segments, the terminals are accommodated in the commutator (insulators). This prevents the commutator from being elongated in the axial direction. However, with this structure, the terminals are arranged at different positions in the axial direction. Thus, different types of terminals become necessary. Accordingly, there is a need for dies corresponding to the different kinds of terminals, and different kinds of components must be handled thereby causing the assembly operation to be complicated. This increases the manufacturing cost of the commutator or the motor including the commutator.

The present invention provides a short-circuiting member, a commutator, and a method for manufacturing a short-circuiting member that prevent a commutator from being elongated in the axial direction and do not increase the number of types of components.

Patent Publication 1
Japanese Laid-Open Patent Publication No. 2000-60073
Patent Publication 2
Japanese Laid-Open Patent Publication No. 2003-189547

SUMMARY OF THE INVENTION

A first aspect of the present invention provides a short-circuiting member. The short-circuiting member includes a plurality of components, each having an outer circumference and an inner circumference. Each of the plurality of components includes a plurality of outer circumference terminals arranged along the outer circumference. A plurality of inner circumference terminals are arranged along the inner circumference. Each of a plurality of connection portions connects a corresponding one of the outer circumference terminals and a corresponding one of the inner circumference terminals with the connection portions separated from each other by a predetermined angle in a circumferential direction. The plurality of outer circumference terminals, the plurality of inner circumference terminals, and the plurality of connection portions are substantially formed along the same plane. The plurality of components are laminated in a state in which the connection portions of one of the plurality of components are reversed to the connection portions of another one of the plurality of components. The outer circumference terminals that are adjacent in a lamination direction are in contact with each other, the inner circumference terminals that are adjacent in the lamination direction are in contact with each other, and the connection portions that are adjacent in the lamination direction are not in contact with each other.

A second aspect of the present invention provides a commutator. The commutator includes a short-circuiting member and a plurality of segments connected to a plurality of outer circumference terminals or a plurality of inner circumference terminals.

A third aspect of the present invention provides a commutator. The commutator includes a commutator main body having a plurality of segments arranged along a circumference and a short-circuiting member including a plurality of components, each having an outer circumference and an inner circumference. Each of the plurality of components includes a plurality of outer circumference terminals arranged along the outer circumference, a plurality of inner circumference terminals arranged along the inner circumference, and a plurality of connection portions. Each connection portion connects a corresponding one of the outer circumference terminals and a corresponding one of the inner circumference terminals with the connection portions separated from each other by a predetermined angle in a circumferential direction. The plurality of outer circumference terminals, the plurality of inner circumference terminals, and the plurality of connection portions are substantially formed along the same plane. The plurality of components are laminated in a state in which the connection portions of one of the plurality of components are reversed to the connection portions of another one of the plurality of components. The outer circumference terminals that are adjacent in a lamination direction are in contact with each other. The inner circumference terminals that are adjacent in the lamination direction are in contact with each other. The connection portions that are adjacent in the lamination direction are not in contact with each other.

A fourth aspect of the present invention is a method for manufacturing a short-circuiting member. The method includes the steps of performing a punching process on a plurality of conductive plate members so that the plurality of connection portions are spaced from one another in a circumferential direction and shaping-stage connection portions are formed for connecting either one of the plurality of outer circumference terminals and the inner circumference terminals, laminating the plurality of punched-out conductive plate members so that the connection portions of one of the plurality of components are reversed to the connection portions of another one of the plurality of components, and removing the shaping-stage connection portions from the plurality of laminated conductive plate members.

DETAILED DESCRIPTION OF THE PREFERRED EMBODIMENTS

A motor 101 including a commutator S that includes 24 segments according to a preferred embodiment of the present invention will now be described with reference to FIGS. 1 to 12.

Figure 1:
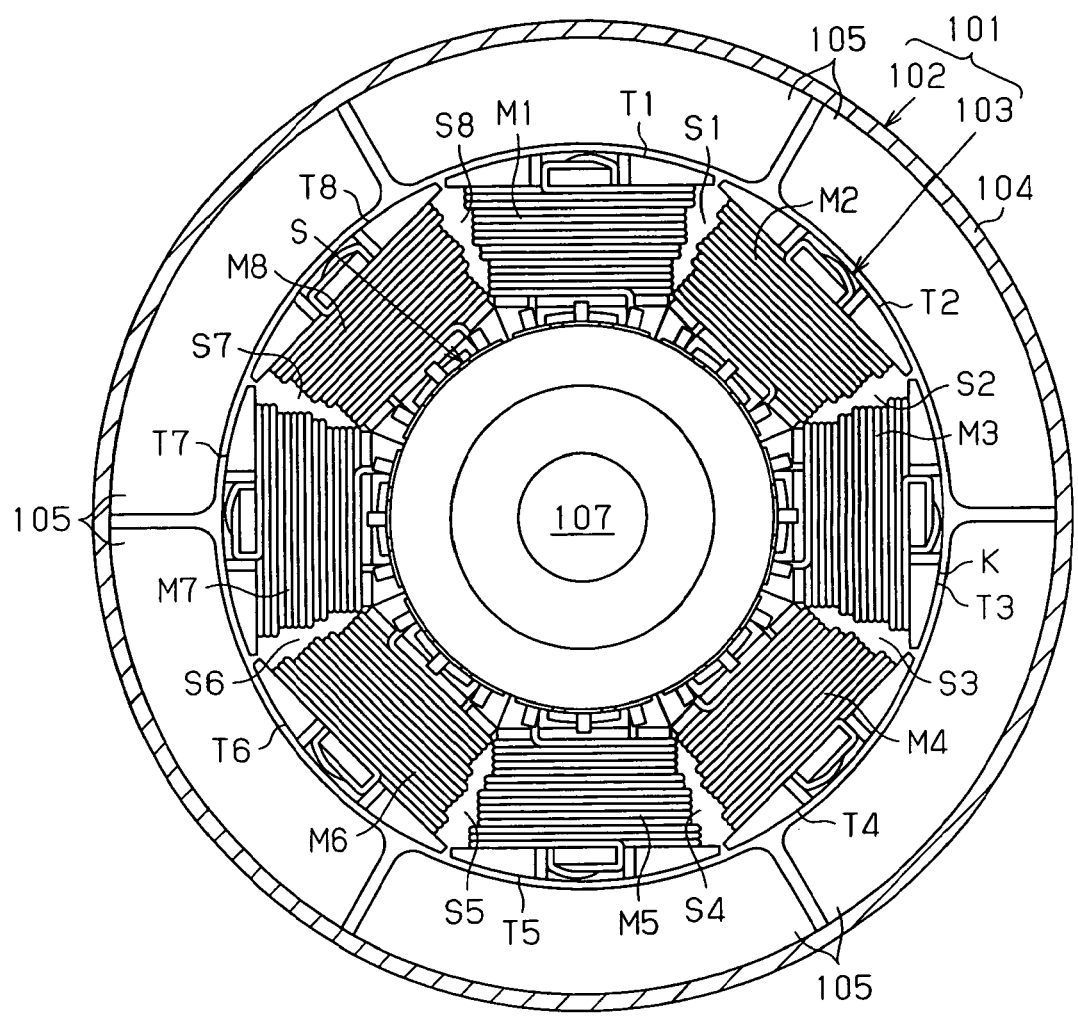
FIG. 1 is a schematic diagram of a motor having a commutator according to a preferred embodiment of the present invention.
Figure 2:
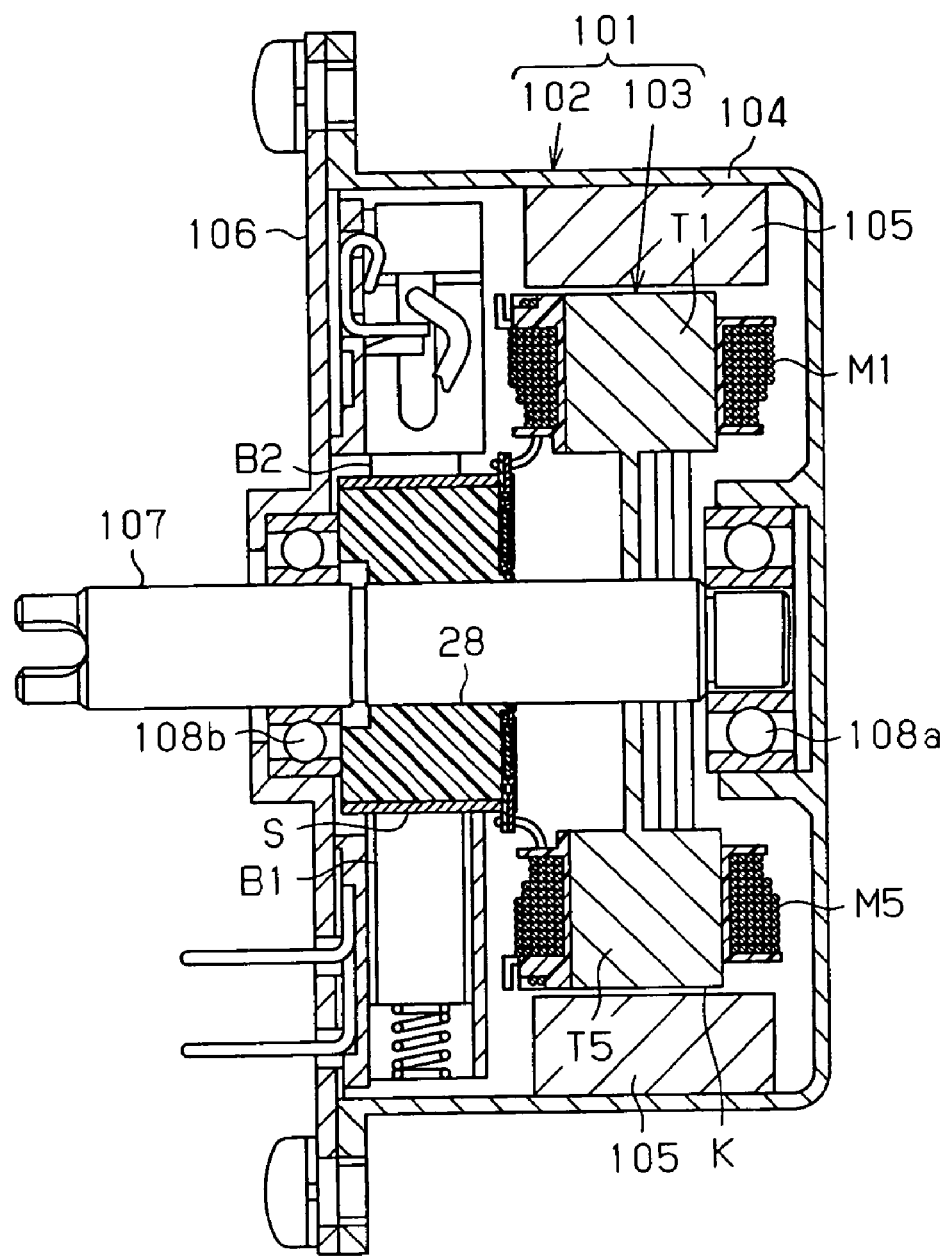
FIG. 2 is a cross-sectional view of the motor of FIG. 1.

As shown in FIGS. 1 and 2, the motor 101 of the preferred embodiment includes a stator 102 and an armature (rotor) 103. The stator 102 includes a yoke housing 104, which has a substantially tubular shape with a closed bottom, and a plurality of (six in the preferred embodiment) permanent magnets 105, which are arranged on the inner circumferential surface of the yoke housing 104 at equiangular intervals. An end frame 106 is fixed to the yoke housing 104 to close the opening of the yoke housing 104. The end frame 106 holds an anode power feeding brush B1 and a cathode power feeding brush B2, which are connected to an external power supply.

The armature 103 includes a rotary shaft 107, which is made of metal, an armature core K, which is fixed to the rotary shaft 107, and a commutator S, which is fixed to the rotary shaft 107. A bearing 108a is held on a middle portion of the bottom of the yoke housing 104, and a bearing 108b is held on a middle portion of the end frame 106. The bearing 108a holds one end of the rotary shaft 108 in a rotatable manner. The bearing 108b holds a middle portion of the rotary shaft 107 in a rotatable manner. In this state, the armature core K faces the permanent magnets 105 and is surrounded by the permanent magnets 105.

Figure 12:
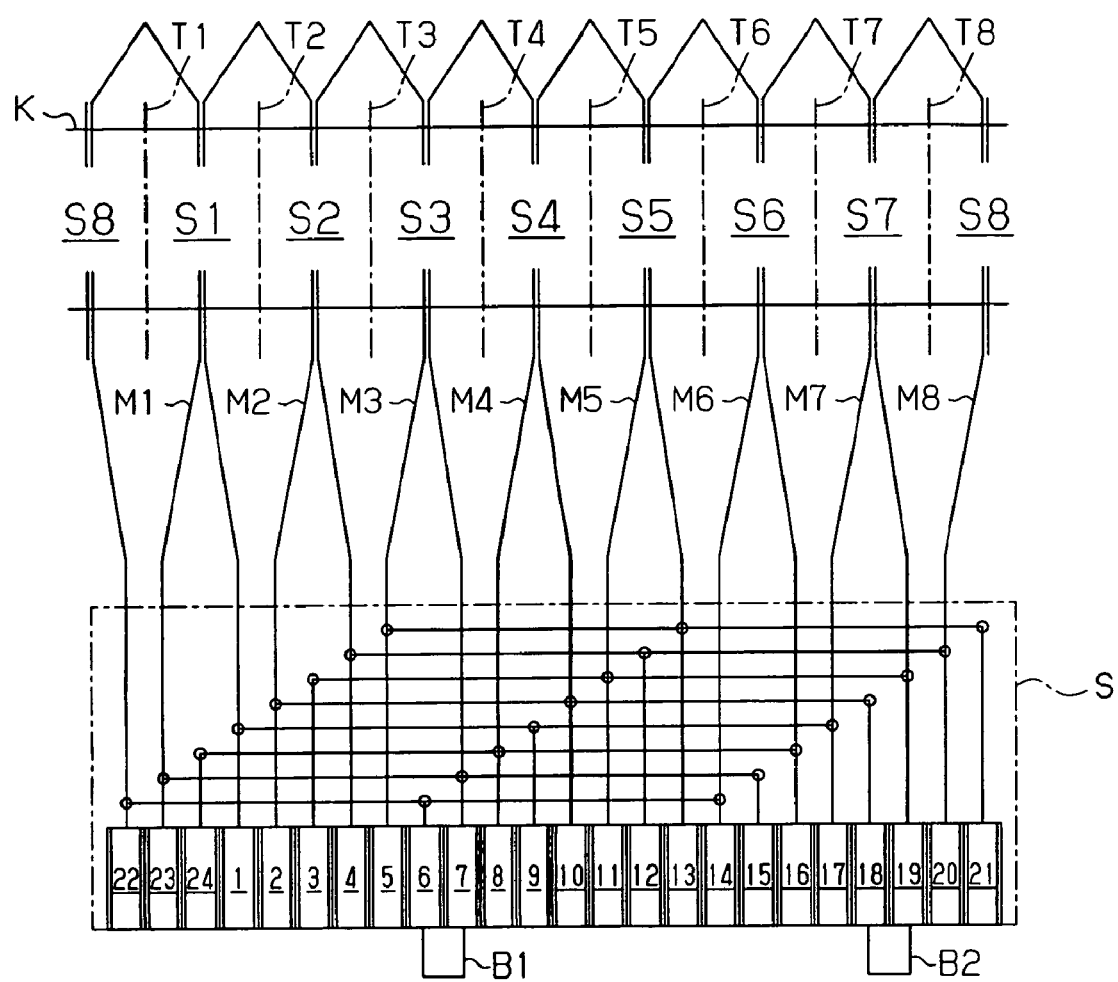
FIG. 12 is an explanatory diagram for describing an armature of the motor of FIG. 1 that is developed on a plane.

The armature core K has eight teeth T1 to T8, which extend radially from the rotary shaft 107. Slots S1 to S8 are formed between the teeth T1 to T8. Winding wires M1 to M8 are respectively wound around the teeth T1 to T8 in a manner that the winding wires M1 to M8 extend through the slots S1 to S8. The two ends of the winding wires M1 to M8 are connected to the commutator S. FIG. 12 is a schematic diagram showing the armature 103 unfolded along a plane.

Figure 3:
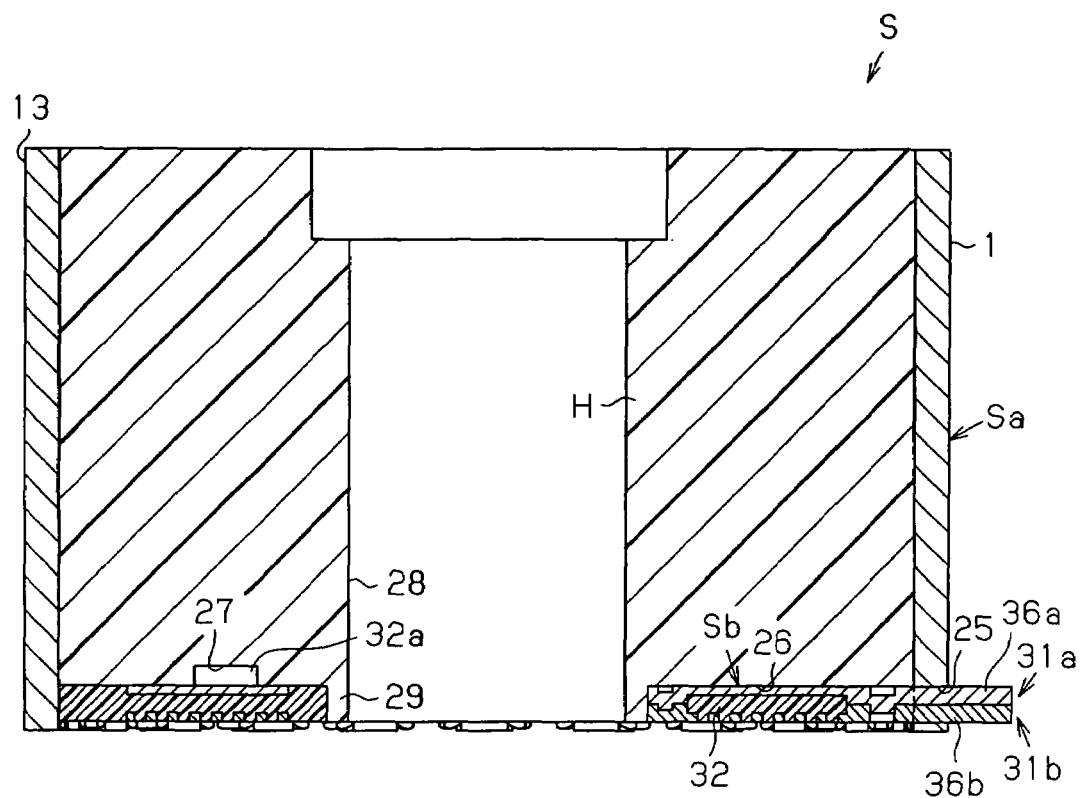
FIG. 3 is a cross-sectional view of the commutator of FIG. 1.

The commutator S includes a commutator main body Sa and a short-circuiting member Sb, as shown in FIG. 3. The commutator main body Sa includes a main body insulator H, which has a substantially cylindrical shape, and a plurality of (24 in the preferred embodiment) segments 1 to 24 (refer to FIG. 12 as FIG. 3 only shows two segments), which are arranged on the outer circumferential surface of the main body insulator H in the circumferential direction. The segments 1 to 24 form a substantially cylindrical shape as a whole. The anode and cathode power feeding blushes B1 and B2 come in contact with (press against) the outer circumferential surface of the segments 1 to 24. A recess 25 (refer to FIGS. 9 to 11) is formed in the end of each of the segments 1 to 24 of the preferred embodiment. A short-circuiting member accommodating recess 26 that has the same depth as the recesses 25 is formed in the end of the main body insulator H. The short-circuiting member accommodating recess 26 is annular and extends from the outer circumference of the main body insulator H to the vicinity of the inner circumference of the main body insulator H. A positioning recess 27, used for positioning, is formed at a predetermined position in the circumferential direction of the short-circuiting member accommodating recess 26. The inner circumference of the main body insulator H defines a shaft hole 28, through which the rotary shaft 107 is inserted. The short-circuiting member accommodating recess 26 is formed in the main body insulator H in the vicinity of the inner circumference (the shaft hole 28) of the main body insulator H. Thus, an annular portion 29 is formed between the inner circumference of the short-circuiting member accommodating recess 26 and the inner circumference of the main body insulator H.

Figure 4A:
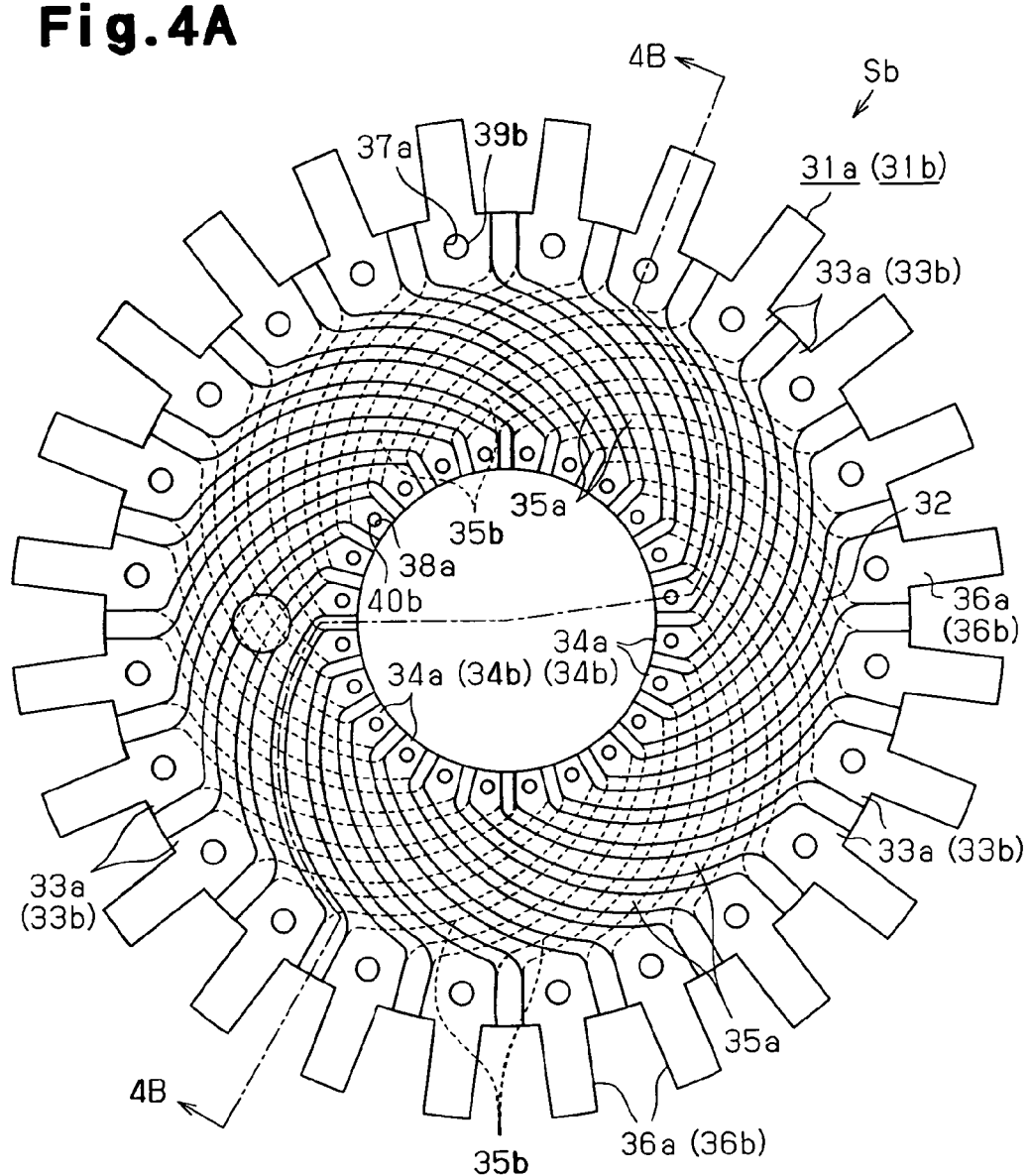
FIG. 4A is a plan view of a short-circuiting member included in the commutator of FIG. 1.
Figure 4B:
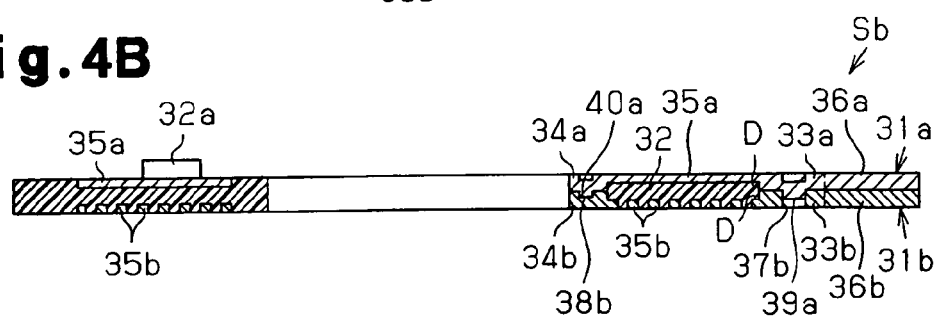
FIG. 4B is a cross-sectional view taken along line 4B-4B in FIG. 4A.

As shown in FIGS. 4A and 4B, the short-circuiting member Sb includes first and second components 31a and 31b, which are used to produce a short-circuit and which have the same structure, and an insulator 32. Each of the first and second components 31a and 31b is a circular plate having a central opening. The first and second components 31a and 31b include a plurality of outer circumference terminals 33a and 33b, which are arranged along the outer circumference, a plurality of inner circumference terminals 34a and 34b, which correspond to the outer circumference terminals 33a and 33b and which are arranged along the inner circumference, and a plurality of connection portions 35a and 35b, which connect the corresponding outer circumference terminals 33a and 33b to the corresponding inner circumference terminals 34a and 34b. In detail, the outer circumference terminals 33a and 33b, the inner circumference terminals 34a and 34b, and the connection portions 35a and 35b are substantially arranged along the same plane. Further, each of the outer circumference terminals 33a and 33b and the corresponding one of the inner circumference terminals 34a and 34b are separated from each other by a predetermined angle in the circumferential direction and connected to each other by a corresponding one of the connection portions 35a and 35b.

In the preferred embodiment, the outer rim of each of the outer circumference terminals 33a and 33b has a predetermined width. More specifically, hooking portions 36a and 36b for hooking the winding wires M1 to M8 are formed on the rims of the outer circumference terminals 33a and 33b. The hooking portions 36a and 36b extend radially outward from the middle of the rims. The hooking portions 36a and 36b function as insertion projections that can be inserted in the recesses 25 in the axial direction. In the preferred embodiment, the first and second components 31a and 31b include twenty-four outer circumference terminals 33a and 33b, twenty-four inner circumference terminals 34a and 34b, twenty-four connection portions 35a and 35b, and twenty-four hooking portions 36a and 36b. The above predetermined angle is 60 degrees in the preferred embodiment. More specifically, each of the connection portions 35a and 35b connects the corresponding one of the outer circumference terminals 33a and 33b and the corresponding one of the inner circumference terminals 34a and 34b in a manner that the outer circumference terminal and the inner circumference terminal are separated from each other by 60 degrees (by a distance corresponding to four terminals in the preferred embodiment) in the circumferential direction. The above expression of "being substantially in the same plane" is intended to mean that each portion is formed in the same layer and are not located at different levels in the axial direction although recesses and projections (stepped portions) may be included. The connection portions 35a and 35b of the preferred embodiment are thinner than the outer circumference terminals 33a and 33b, the inner circumference terminals 34a and 34b, and the hooking portions 36a and 36b. Thus, stepped portions D (refer to FIG. 4B) are formed on one surface of each of the components 31a and 31b. Further, fitting recesses (holes) 37a and 37b and fitting projections 39a and 39b are formed in the outer circumference terminals 33a and 33b in a manner that the recesses 37a and 37b and the projections 39a and 39b are alternately adjacent to one another in the circumferential direction (refer to FIG. 5). Fitting recesses (holes) 38a and 38b and fitting projections 40a and 40b are formed in the inner circumference terminals 34a and 34b in a manner that the recesses 38a and 38b and the projections 40a and 40b are alternately adjacent to one another in the circumferential direction (refer to FIG. 5). Each of the fitting recesses 37a, 37b, 38a, and 38b, and the fitting projections 39a, 39b, 40a, and 40b is located at a position substantially corresponding to the middle of the width of the corresponding one of the outer circumference terminals 33a and 33b and the inner circumference terminal 34a and 34b in the circumferential direction and also located at a position substantially corresponding to the middle of the length of the corresponding one of the outer circumference terminals 33a and 33b and the inner circumference terminal 34a and 34b in the radial direction. Further, each of the connection portions 35a and 35b is formed along an involute curve. The connection portions 35a and 35b are spiral as a whole.

The first and second components 31a and 31b are laminated in a manner that the connection portions 35a and the connection portions 35b are reversed from each other (the spiral direction of the connection portions 35a differs from the spiral direction of the connection portions 35b). The surfaces of the outer circumference terminals 33a come in contact with the surfaces of the outer circumference terminals 33b, the surfaces of the inner circumference terminals 34a come in contact with the surfaces of the inner circumference terminals 34b, and the connection portions 35a do not come in contact with the connection portions 35b (due to the stepped portions D). In the first and second components 31a and 31b, the fitting projections 39a, 39b, 40a, and 40b are respectively fitted to the fitting recesses 37a, 37b, 38a, and 38b so that the outer circumference terminals 33a and 33b are fixed to each other and the inner circumference terminals 34a and 34b are fixed to each other.

The insulator 32 is formed from an insulating resin material and is arranged between adjacent connection portions 35a and 35b. In detail, the insulator 32 is formed to fill gaps between the outer circumference terminals 33a and 33b, between the inner circumference terminals 34a and 34b and between the connection portions 35a and 35b. Further, the insulator 32 includes a positioning projection 32a, which is formed at a position corresponding to the positioning recess 27 and which functions as a positioning unit for positioning the first and second components 31a and 31b in the circumferential direction.

Figure 10:
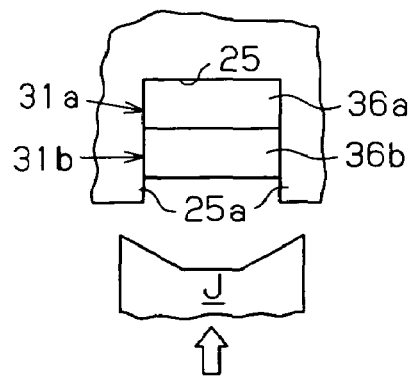
FIG. 10 is an explanatory diagram for describing a structure for fixing a commutator main body and the short-circuiting member of the commutator of FIG. 1.
Figure 11:
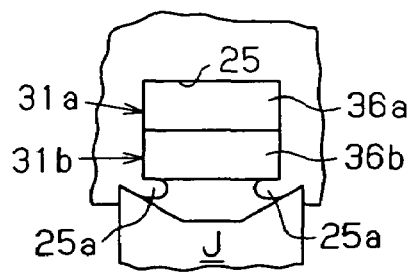
FIG. 11 is an explanatory diagram for describing the structure for fixing the commutator main body and the short-circuiting member of the commutator of FIG. 1.

The short-circuiting member Sb is fixed to the commutator main body Sa in a manner that the outer circumference terminals 33a and 33b are connected to the segments 1 to 24. In detail, the short-circuiting member Sb is arranged in a manner that the positioning projection 32a is fit in the positioning recess 27 and parts excluding the hooking portions 36a and 36b are accommodated within the short-circuiting member accommodating recess 26. The hooking portions 36a and 36b are inserted into and project out of the recesses 25 (from the outer circumference of the commutator main body Sa). As shown in FIGS. 10 and 11, the hooking portions 36a and 36b are fitted between a pair of arms 25a that form the recess 25 and fixed to each other so that the short-circuiting member Sb is fixed to the commutator main body Sa. FIGS. 10 and 11 are schematic diagrams partially showing the end of the commutator S as viewed from the outer side in the radial direction and illustrates a jig J for retaining the hooking portions 36a and 36b between the arms 25a. Further, the outer circumference terminals 33a and 33b included in the short-circuiting member Sb of the preferred embodiment are designed in a manner that the outer circumference of the short-circuiting member Sb excluding the hooking portions 36a and 36b comes in contact with the inner circumference of the segments 1 to 24 in a state in which the outer circumference terminals 33a and 33b are fixed. Further, the short-circuiting member Sb is arranged in a manner that it does not project outward from the end surface of the commutator main body Sa. The inner circumference terminals 34a and 34b included in the short-circuiting member Sb are located outward from the shaft hole 28 in the radial direction. The annular portion 29 of the main body insulator H is arranged between the inner circumference terminals 34a and 34b and the shaft hole 28.

Next, the method for manufacturing the short-circuiting member Sb with the above-described structure will be described in detail.

Figure 5:
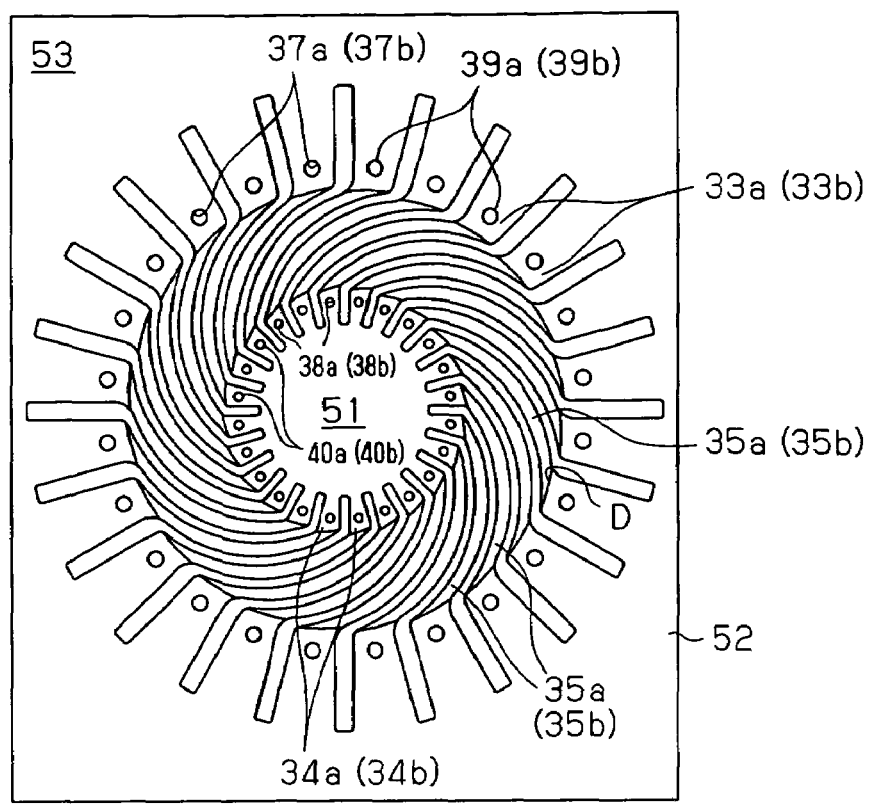
FIG. 5 is an explanatory diagram for describing a manufacturing method for the short-circuiting member of FIG. 4A.
Figure 7:
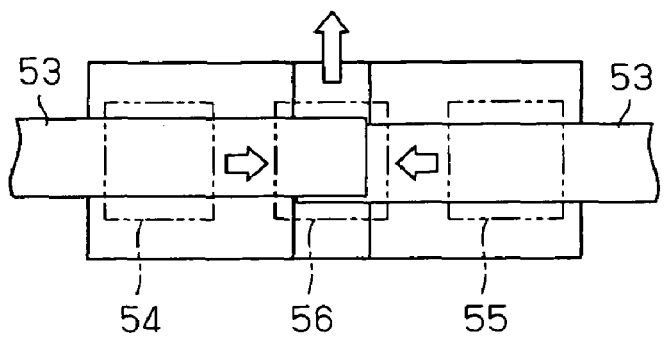
FIG. 7 is a diagram for describing the manufacturing method for the short-circuiting member of FIG. 4A.

First, in a punching process, conductive plate members 53 are punched out in a manner that the connection portions 35a (35b) included in one component 31a (31b) are spaced from one another in the circumferential direction, and an inner side connection portion 51 and an outer side connection portion 52, which function as shaping-stage connection portions, are formed in each conductive plate member 53 as shown in FIG. 5. In detail, the inner side connection portion 51 that connects the inner circumference terminals 34a (34b) and the outer side connection portion 52 that connects the outer circumference terminals 33a (33b) are formed in each conductive plate member 53. In the preferred embodiment, each conducive plate member 53 is punched out in a manner that the outer circumference terminals 33a (33b) are spaced from one another in the circumferential direction and the inner circumference terminals 34a (34b) are spaced from one another in the circumferential direction. The fitting recesses 37a, 37b, 38a, and 38b, the fitting projections 39a, 39b, 40a, and 40b, and the stepped portions D are formed at the same time. In the preferred embodiment, the punching process is performed by first and second punching operation units 54 and 55 in a manner that the connection portions 35a and 35b are formed in reversed directions as shown in FIG. 7. FIG. 7 is a schematic diagram showing a manufacturing apparatus (including the first and second punching operation units 54 and 55) and the continuous conductive plate members 53 as viewed from above, and does not show the punched shapes of the conductive plate members 53.

Figure 6:
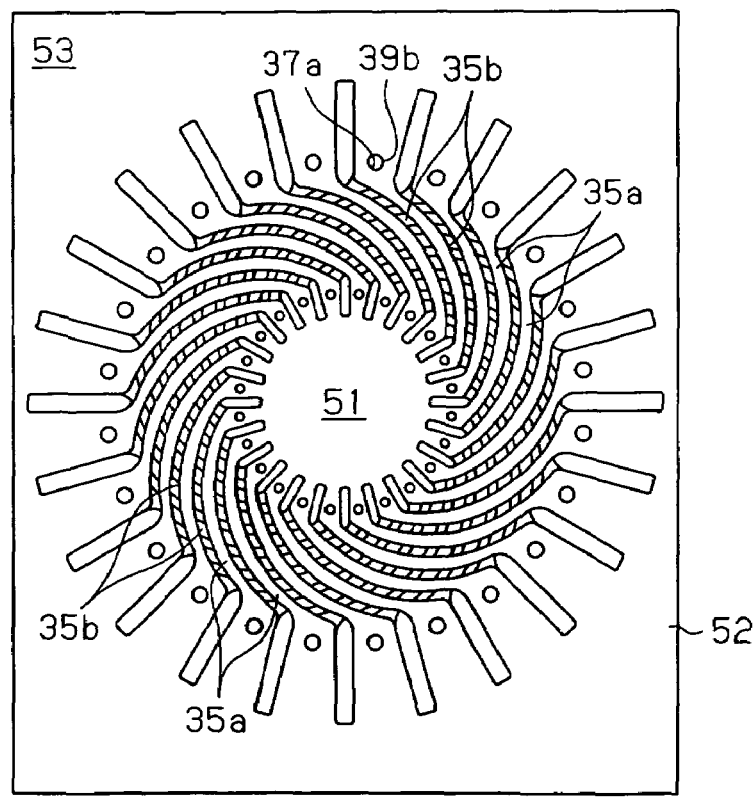
FIG. 6 is a diagram for describing the manufacturing method for the short-circuiting member of FIG. 4A.

As shown in FIG. 7, the two conductive plate members 53 that are punched out by the first and second punching operation units 54 and 55 are moved to a lamination operation unit 56 while maintaining the orientations of the two conductive plate members 53 to undergo a lamination process. In the lamination process, the punched two conductive plate members 53 are laminated in a manner that the connection portions 35a and 35b are reversed from each other as shown in FIG. 6. In this stage, the fitting projections 39b are fitted to the fitting recesses 37a, the fitting projections 39a are fitted to the fitting recesses 37b, the fitting projections 40b are fitted to the fitting recesses 38a, and the fitting projections 40a are fitted to the fitting recesses 38b.

Next, in an insulator filling process, an insulating resin material is filled and cured between the two conductive plate members 53. In detail, the two laminated conductive plate members 53 are placed in a mold that is not shown, and a molten insulating resin material is filled and cured in gaps formed between the two conductive plate members 53. This forms the insulator 32. The positioning projection 32a is formed at the same time.

Figure 8:
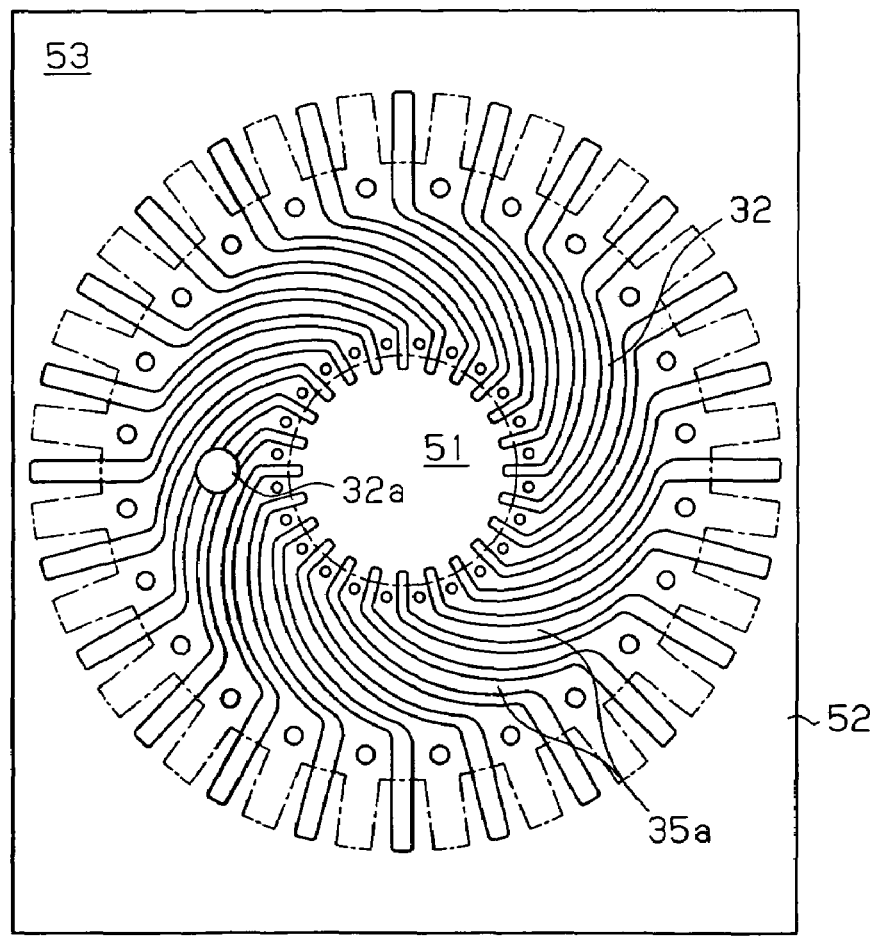
FIG. 8 is a diagram for describing the manufacturing method for the short-circuiting member of FIG. 4A.
Figure 9:
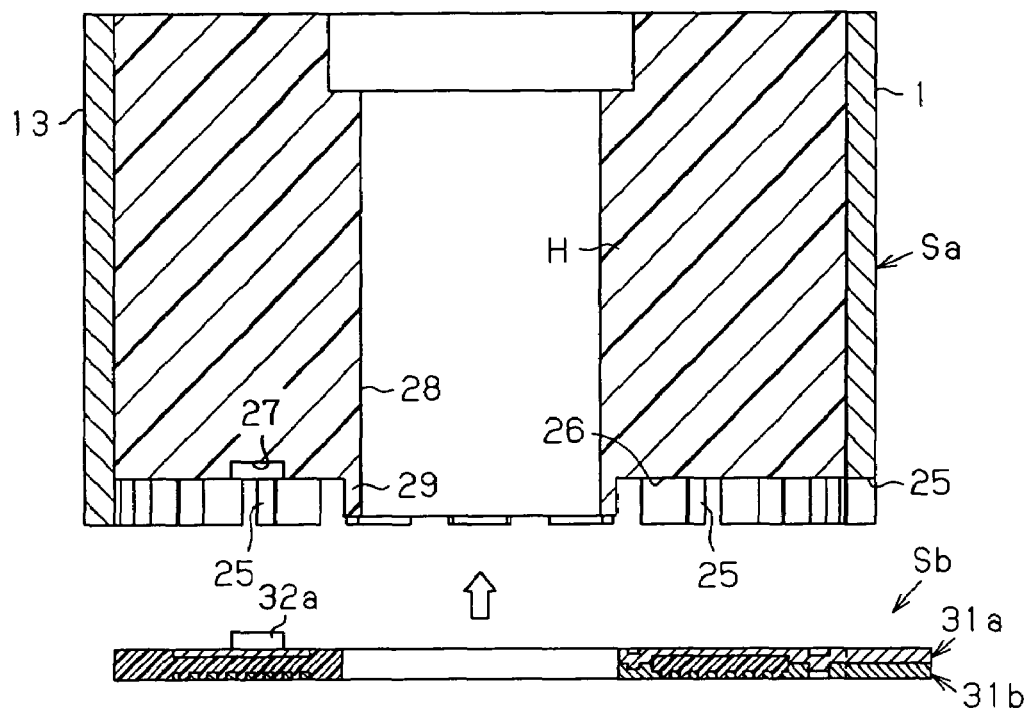
FIG. 9 is an explanatory diagram for describing the manufacturing method for the short-circuiting member of FIG. 4A.

Next, in a removing process, the inner side connection portions 51 and the outer side connection portions 52 of the laminated two conductive plate members 53 are removed (punched out) as shown by the broken lines in FIG. 8. This completes the manufacture of the short-circuiting member Sb (refer to FIG. 4).

In the short-circuiting member Sb of the above-described structure, the outer circumference terminals 33a and 33b (the inner circumference terminals 34a and 34b) are electrically connected to one another in a manner that they are separated from one another by 120 degrees in the circumferential direction. Thus, in the commutator S, predetermined segments (e.g., set of the segments 1, 9, and 17 and set of the segments 5, 13, and 21) are short-circuited by the short-circuiting member Sb (in detail, by the hooking portions 36a, the outer circumference terminals 33a, the connection portions 35a, the inner circumference terminals 34a and 34b, the connection portions 35b, the outer circumference terminals 33b, and the hooking portions 36b). Thus, for example, as shown in FIG. 12, current flows not only through the segments 6, 7, 18, and 19 that are in direct contact with the anode and cathode power feeding brushes B1 and B2 but also through the segments 2, 3, 10, 11, 14, 15, 22, and 23 that are short-circuited with the segments 6, 7, 18, and 19 by the short-circuiting member Sb. This enables many winding wires M1 to M8 to be supplied with current without increasing the quantity of the anode and cathode power feeding brushes B1 and B2.

The preferred embodiment has the advantages described below.

(1) The two components 31a and 31b that are formed in the same plane are laminated so that sets of three of the twenty-four outer circumference terminals 33a and 33b (the inner circumference terminals 34a and 34b) spaced at intervals of 120 degrees are electrically connected to one another. More specifically, the above structure reduces (as compared with an equalizer according to a prior art technique) the number of conductors (including the connection portions 35a and 35b) used for short-circuiting purpose in the axial direction (lamination direction), and thereby prevents the commutator S (armature) from being elongated in the axial direction. Further, the first and second components 31a and 31b, which are formed in the same plane, are easily formed from the conductive plate members 53. Since the same components 31a and 31b are used, the number of different kinds of components does not increase. Further, the outer circumference terminals 33a come in direct contact with the outer circumference terminals 33b, and the inner circumference terminals 34a come in direct contact with the inner circumference terminals 34b. This structure ensures reliable electrical connection between the terminals without using other members (such as pins) for connecting the terminals. As a result, many different kinds of dies do not need to be used, and different kinds of components do not need to be handled. This prevents the manufacturing cost of the commutator S or a motor including the commutator S from increasing. Further, the short-circuiting member Sb is fixed to the commutator main body Sa having the segments 1 to 24 (the short-circuiting member Sb does not need to be formed at the same time as when the commutator main body Sa is formed). Thus, the commutator main body Sa can be commonly used in a commutator that does not require the short-circuiting member Sb (does not require short-circuiting).

(2) The connection portions 35a and 35b are thinner than the outer circumference terminals 33a and 33b and the inner circumference terminals 34a and 34b. The insulator 32 is arranged between the connection portions 35a and 35b that are adjacent in the lamination direction. Thus, the insulator 32 ensures that the connection portions 35a are prevented from being short-circuited with the connection portions 35b. Further, the insulator 32 maintains the distance between the first component 31a and the second component 31b.

(3) The main body insulator H includes the positioning recess 27, and the insulator 32 includes the positioning projection 32a that is fit in the recess 27. Thus, the short-circuiting member Sb is easily positioned with and fixed to the commutator main body Sa. The positioning projection 32a is formed in the insulator filling process. Thus, an additional process for formation of the positioning projection 32a.

(4) The fitting recesses 37a, 37b, 38a, and 38b and the fitting projections 39a, 39b, 40a, and 40b are alternately formed in the circumferential direction in the outer circumference terminals 33a and 33b and the inner circumference terminals 34a and 34b. Thus, when the components 31a and 31b are laminated, the positions of the fitting recesses 37a, 37b, 38a, and 38b respectively coincide with the positions of the fitting projections 39a, 39b, 40a, and 40b so that the recesses and the projections are easily fitted to each other and fixed to each other.

(5) Each of the connection portions 35a and 35b is formed along an involute curve. This reduces unnecessary space (unnecessary space excludes space required to ensure insulation between the connection portions 35a and 35b) along a plane (as viewed in the axial direction). In this case, the area of each part (inner and outer sides in the radial direction) of the connection portions 35a and 35b as viewed in the axial direction is larger as compared with when each connection portion is formed with a simple linear shape. As a result, the thickness of the short-circuiting member Sb in the axial direction may be minimized while insulation between the connection portions 35a and 35b is ensured.

(6) The short-circuiting member Sb, excluding the hooking portions 36a and 36b, is accommodated in the short-circuiting member accommodating recess 26 located inward from the segments 1 to 24 in the radial direction. This structure prevents brush wear particles from collecting on the short-circuiting member Sb (excluding the hooking portions 36a and 36b). In particular, the short-circuiting member Sb does not project outward (at all) from the end surface of the commutator main body Sa in the axial direction in the preferred embodiment. This structure ensures that brush wear particles are prevented from collecting on the short-circuiting member Sb (excluding the hooking portions 36a and 36b). As a result, the connection portions 35a and 35b that are adjacent in the circumferential direction in the short-circuiting member Sb are prevented from being short-circuited.

(7) The short-circuiting member Sb (excluding the hooking portions 36a and 36b) is accommodated in the short-circuiting member accommodating recess 26 (the short-circuiting member Sb does not project outward from the end surface of the commutator main body Sa in the axial direction). Thus, the short-circuiting member Sb does not elongate the commutator S in the axial direction.

Further, the outer circumference terminals 33a and 33b include the hooking portions 36a and 36b for holding the winding wires M1 to M8. The hooking portions 36a and 36b extend in the radial direction and project outward from the outer surface of the commutator main body Sa. Thus, the short-circuiting member Sb is overlapped in the axial direction with the hooking portions of the commutator S (even if the short-circuiting member Sb is not accommodated within the short-circuiting member accommodating recess 26). Thus, the short-circuiting member Sb does not elongate the commutator S in the axial direction.

(8) The inner circumference terminals 34a and 34b of the short-circuiting member Sb are arranged outward from the shaft hole 28 and do not come in contact with the rotary shaft 107. Thus, even when the rotary shaft 107 is made of metal, which is a conductive material, like in the preferred embodiment, the short-circuiting member Sb is prevented from being short-circuited with the rotary shaft 107 (insulation is ensured). In addition, the annular portion 29 of the main body insulator H is arranged between the inner circumference terminals 34a and 34b and the shaft hole 28. The annular portion 29 ensures prevention of short-circuiting between the short-circuiting member Sb and the rotary shaft 107. Further, the inner circumference terminals 34a and 34b are engaged with the annular portion 29. As a result, the short-circuiting member Sb is firmly fixed to the main body insulator H.

(9) The recesses 25 are formed in the ends of the segments 1 to 24. The hooking portions 36a and 36b, which extend outward in the radial direction and are inserted in the recesses 25 in the axial direction, are formed in the outer circumference terminals 33a and 33b. The hooking portions 36a and 36b are inserted in the recesses 25 so that the short-circuiting member Sb is arranged at the end of the commutator main body Sa. As a result, the short-circuiting member Sb is easily arranged at the end of the commutator main body Sa and fixed in the circumferential direction by moving the short-circuiting member Sb in the axial direction with respect to the commutator main body Sa and inserting the hooking portions 36a and 36b of the short-circuiting member Sb into the recesses 25. Further, the short-circuiting member Sb is easily positioned in the axial direction and the short-circuiting member Sb is prevented from vibrating in the axial direction by placing the hooking portions 36a and 36b in contact with the bottoms of the recesses 25.

(10) The recesses 25 are formed in the ends of the segments 1 to 24, and the hooking portions 36a and 36b fitted and fixed to the two arms 25a that form the recess 25. Thus, the hooking portions 36a and 36b are easily fixed to the commutator main body Sa and the short-circuiting member Sb is easily fixed to the commutator main body Sa. This ensures that the segments 1 to 24 are electrically connected to the outer circumference terminals 33a and 33b by the hooking portions 36a and 36b.

(11) The outer circumference of the outer circumference terminals 33a and 33b excluding the hooking portions 36a and 36b comes in contact with the inner circumference of the segments 1 to 24 in the radial direction. This structure prevents the short-circuiting member Sb from being moved in the radial direction by, for example, a centrifugal force generated when the rotary shaft 107 rotates.

(12) Each of the fitting recesses 37a, 37b, 38a, and 38b, and the fitting projections 39a, 39b, 40a, and 40b is formed at a location that is substantially the middle of the corresponding one of the outer circumference terminals 33a and 33b and the inner circumference terminals 34a and 34b in the circumferential direction and is substantially the middle of the corresponding one of the outer circumference terminals 33a and 33b and the inner circumference terminals 34a and 34b in the radial direction. This structure strengthens the engagement of each part (the outer circumference terminals 33a and 33b and the inner circumference terminals 34a and 34b) while maintaining rigidity.

(13) With the above manufacturing method, the inner side connection portions 51 and the outer side connection portions 52 for connecting the inner and outer sides of the connection portions 35a and 35b in the radial direction are formed (the connection portions 35a and 35b are not separated) in the conductive plate members 53 that are punched out in the punching process. Thus, materials (the conductive plate members 53) are easily handled in the lamination process (and in the insulator filling process). As a result, the short-circuiting member Sb can be easily manufactured.

(14) With the above manufacturing method, the insulator 32 is formed between the connection portions 35a and 35b in the insulator filling process before the removing process in which the inner side connection portions 51 and the outer side connection portions 52 of the laminated two conductive plate members 53 are removed (punching out). Thus, after the removing process, the insulator 32 maintains the interval between the first component 31a and the second component 31b.

(15) With the above manufacturing method, the punching process is performed by each of the first and second punching operation units 54 and 55 in a manner that the connection portions 35a and 35b are reversed from each other. The two conductive plate members 53 that are punched out by the first and second punching operation units 54 and 55 are moved to the common lamination operation unit 56 while maintaining their orientations, and then the lamination process is performed. This enables the operation units 54 to 56 to be constantly operated. Further, this eliminates the need for the operation of turning around one of the two conductive plate members 53 to reverse the connection portions 35a and 35b with respect to each other. As a result, the short-circuiting member Sb is efficiently manufactured at a high speed.

The above embodiment may be modified in the following forms.

Figure 13:
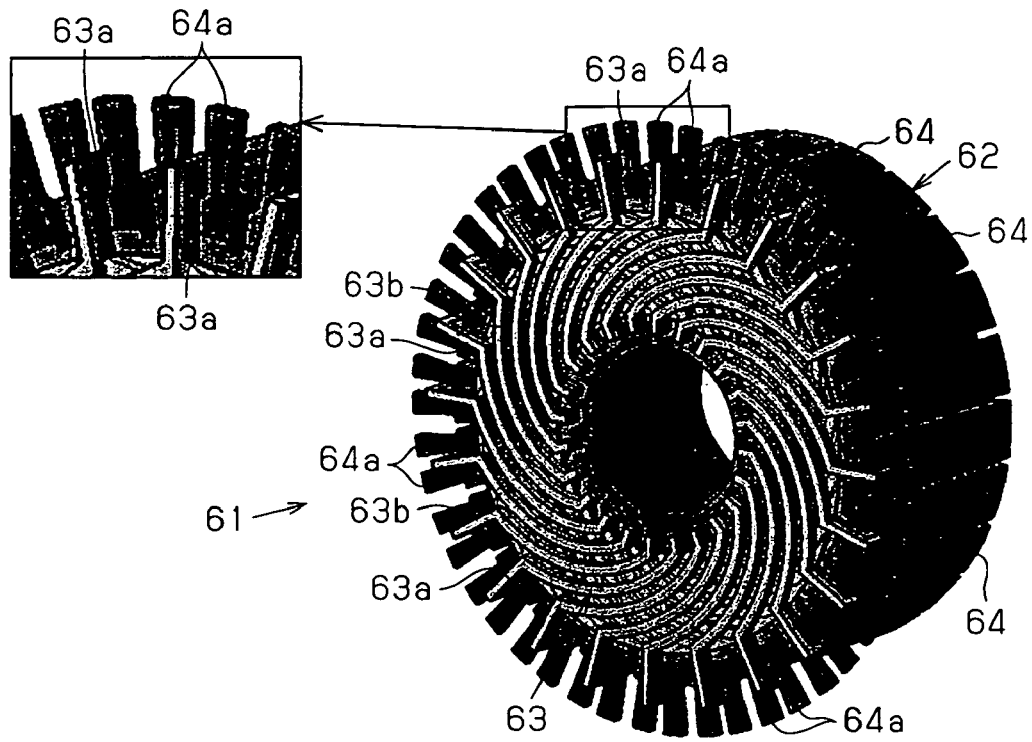
FIG. 13 is a perspective view showing a commutator according to a first modification of the present invention.

The commutator S (the commutator main body Sa and the short-circuiting member Sb) in the above embodiment may be modified to a commutator 61 (a commutator main body 62 and a short-circuiting member 63) as shown in FIG. 13. As shown in FIG. 13, the short-circuiting member 63 includes outer circumference terminals 63a shaped differently from the outer circumference terminals (33a and 33b) of the above embodiment. In detail, the hooking portions (36a and 36b) for hooking the winding wires in the above embodiment are not formed in the outer circumference terminals 63a. Further, the width of each outer circumference terminal 63a (width in the circumferential direction as viewed in the axial direction) is set to have substantially the same width as each connection portion 63b (having substantially the same shape as the connection portions 35a and 35b of the above embodiment). Each segment 64 of the commutator main body 62 has a pair of hooking portions 64a (for hooking a winding wire) that project outward in the radial direction. The outer circumference terminals 63a are arranged (fixed by swaging) in a manner that each outer circumference terminal 63a is sandwiched between the base ends of one pair of hooking portions 64a. In this modification, the parts sandwiching each outer circumference terminal 63a form the recess of each segment 64, and the sandwiched part of each outer circumference terminal 63a forms the insertion projection. Further, the short-circuiting member 63 partially projects from the commutator main body 62 in the axial direction (extends outside the commutator main body 62). In this modification, each outer circumference terminal 63a does not include a hooking portion and has a uniform width. Thus, the outer circumference terminals 63a do not come in contact with the inner circumference of the segments 64.

Figure 14:
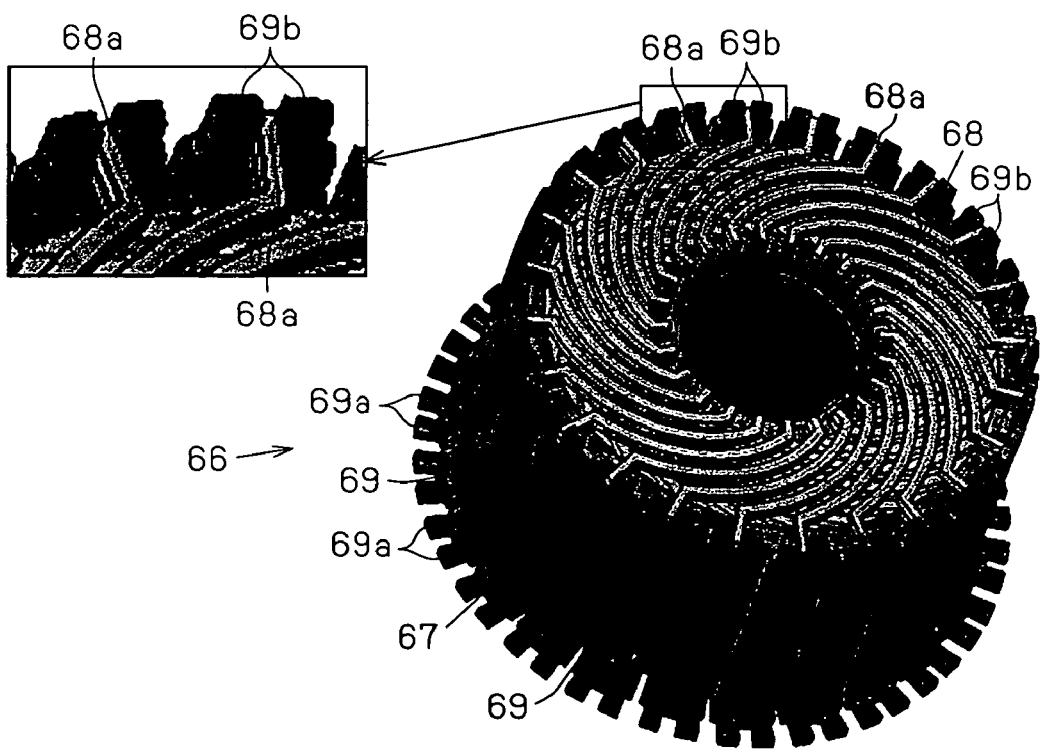
FIG. 14 is a perspective view showing a commutator according to a second modification of the present invention.

The commutator S (the commutator main body Sa and the short-circuiting member Sb) of the above embodiment may be modified to a commutator 66 (a commutator main body 67 and a short-circuiting member 68) shown in FIG. 14. As shown in FIG. 14, the short-circuiting member 68 is formed to have substantially the same shape as the short-circuiting member of the above modification (refer to FIG. 13). However, outer circumference terminals 68a do not project outward from the outer circumferential surface of the commutator main body 67 (segments 69) in the radial direction. In detail, the outer ends of the outer circumference terminals 68a substantially coincide with the outer circumferential surface of the commutator main body 67. A pair of hooking portions 69a (for hooking a winding wire) that project outward in the radial direction is formed at a first end of each segment 69 in the axial direction. A pair of holding portions 69b that project in the axial direction is formed at a second end of each segment 69 in the axial direction. The outer circumference terminals 68a are arranged (fixed by swaging) in a manner that each outer circumference terminal 68a is sandwiched by one pair of holding portions 69b formed at the second end of each segment 69 in the axial direction. In this modification, the portions sandwiching each outer circumference terminal 68a (holding portions 69b) form the recess of each segment 69, and the sandwiched portion of each outer circumference terminal 68a forms an insertion projection. Each outer circumference terminal 68a does not have a hooking portion and has a uniform width. Thus, the outer circumference terminals 68a do not come in contact with the inner circumference of the segments 69.

Figure 15:
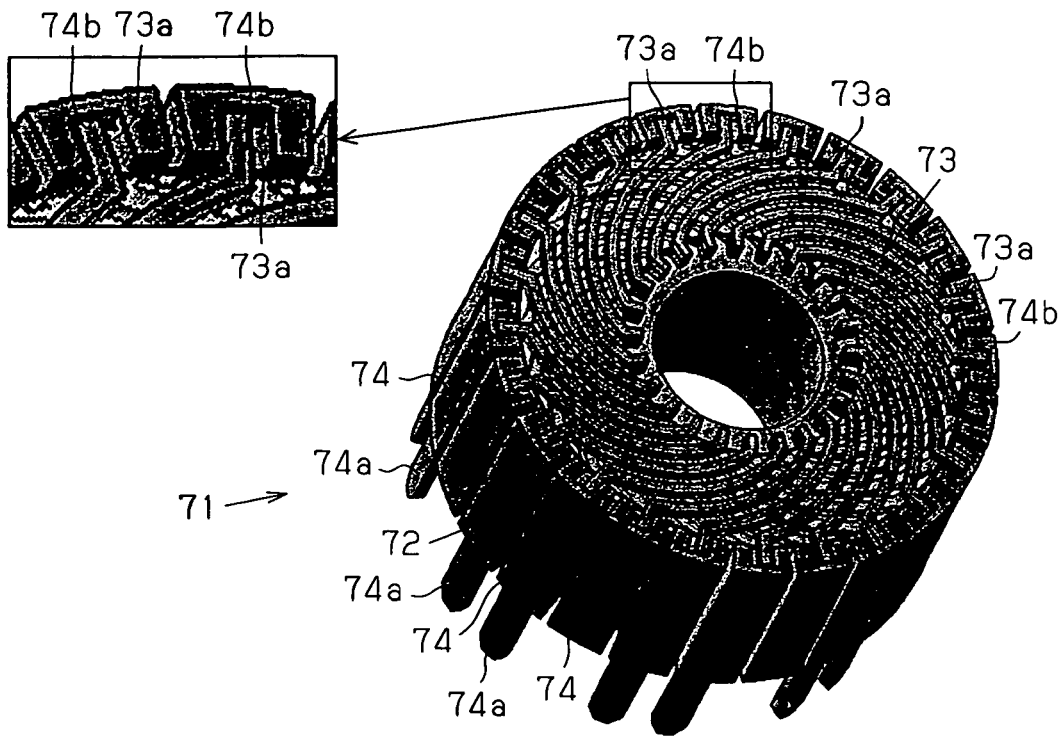
FIG. 15 is a perspective view showing a commutator according to a third modification of the present invention.

The commutator S (the commutator main body Sa and the short-circuiting member Sb) of the above embodiment may be modified to a commutator 71 (a commutator main body 72 and a short-circuiting member 73) shown in FIG. 15. As shown in FIG. 15, the short-circuiting member 73 is formed to have substantially the same shape as the short-circuiting member of the above modification (refer to FIG. 14). However, outer circumference terminals 73a do not project outward from the outer circumferential surface of the commutator main body 72 (segments 74) in the radial direction. In detail, the outer ends of the outer circumference terminals 73a are located inward from the outer circumferential surface of the commutator main body 72. A connecting terminal 74a that projects in the axial direction is formed at a first end of each predetermined segment 74. A connecting recess 74b is formed at a second end of each of the segments 74. The outer circumference terminals 73a are arranged (welded) in a manner that each outer circumference terminal 73a is accommodated in the connecting recess 74b formed at the second end of each segment 74. In this modification, the part accommodated in the connecting recess 74b of the outer circumference terminal 73a forms the insertion projection. Further, the outer circumference terminals 73a come in contact with the inner circumference of the segments 74. The connecting terminals 74a are inserted in coil terminals arranged in an armature core that is not shown so that winding wires are connected to the commutator 71.

Figure 16:
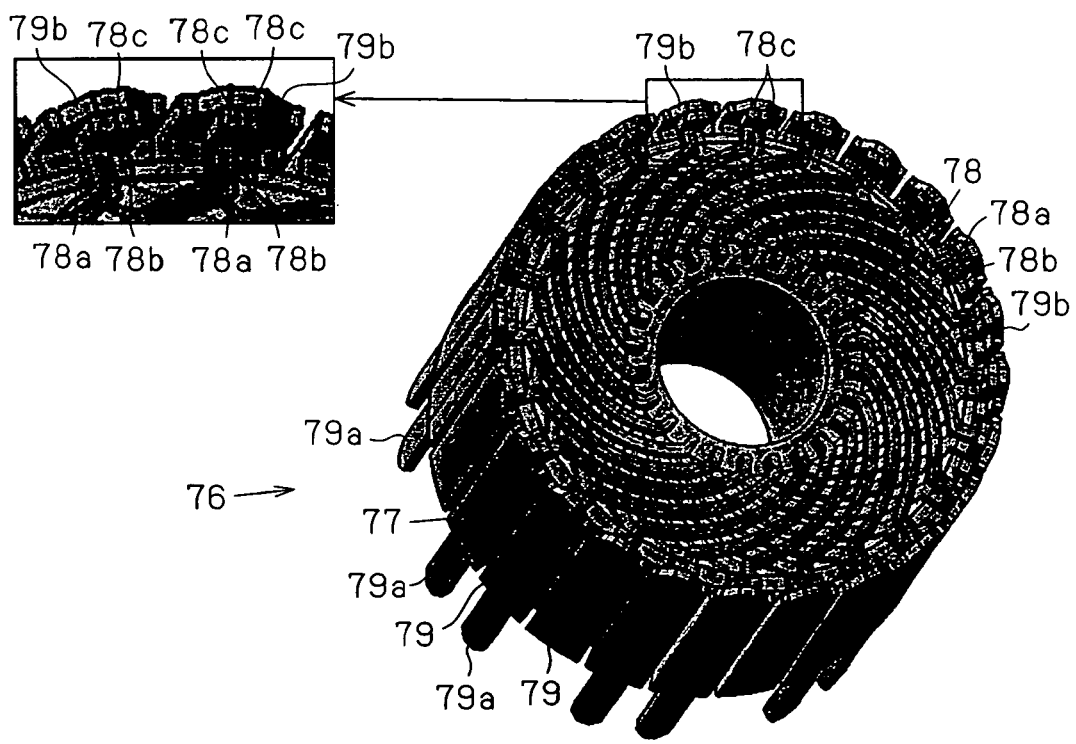
FIG. 16 is a perspective view showing a commutator according to a fourth modification of the present invention.

The commutator S (the commutator main body Sa and the short-circuiting member Sb) of the above embodiment may be modified to a commutator 76 (commutator main body 77 and short-circuiting member 78) shown in FIG. 16. As shown in FIG. 16, the short-circuiting member 78 is formed to have substantially the same shape as the short-circuiting member of the above modification (refer to FIG. 15). However, outer circumference terminals 78a and 78b of each pair in different layers are formed at different positions in the circumferential direction (do not come in contact with each other in the lamination direction (axial direction)). Each of the outer circumference terminals 78a and 78b has a bent portion 78c that is bent in the axial direction. The bent portions 78c of each pair of the outer circumference terminals 78a and 78b come in contact with each other in the circumferential direction. A connecting terminal 79a that projects in the axial direction is formed at a first end of each predetermined segment 79. A projection wall 79b that projects in the axial direction is formed at a second end of each of the segments 79. The outer circumference terminals 78a and 78b are arranged (fixed by welding) in a manner that the bent portion 78c of each outer circumference terminal comes in contact with the inner circumference of the projection wall 79b in the radial direction at the second end of each segment 79 in the axial direction. In this example, the connecting terminals 79*a* are inserted in coil terminals arranged in an armature core that is not shown so that the commutator 76 is connected to winding wires.

Figure 17:
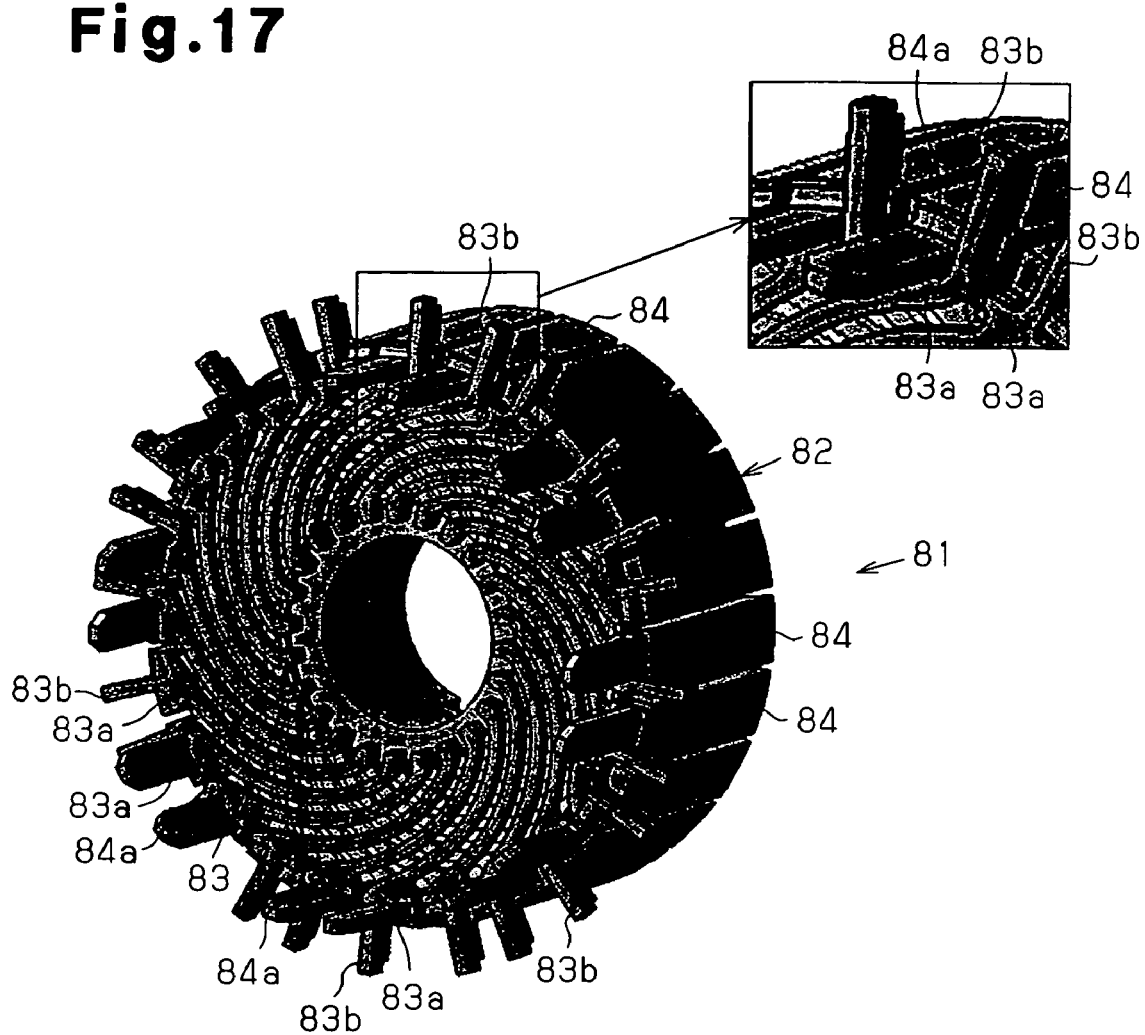
FIG. 17 is a perspective view showing a commutator according to a fifth modification of the present invention.

The commutator S (the commutator main body Sa and the short-circuiting member Sb) of the above embodiment may be modified to a commutator 81 (a commutator main body 82 and a short-circuiting member 83) shown in FIG. 17. As shown in FIG. 17, the short-circuiting member 83 includes outer circumference terminals 83*a* shaped differently from the outer circumference terminals 33*a* and 33*b* of the above embodiment. In detail, each outer circumference terminal 83*a* includes an auxiliary hooking portion 83*b* for hooking a winding wire. More specifically, a connecting terminal 84*a* that projects in the axial direction is formed at one end of each predetermined segment 84 in the axial direction. The auxiliary hooking portions 83*b* are formed and arranged (fixed by welding) to avoid the connecting terminals 84*a* (arranged at positions different from one another in the circumferential direction and come in contact with the connecting terminals 84*a* in the circumferential direction in this modification). In this modification, the connecting terminals 84*a* are inserted in coil terminals arranged in an armature core that is not shown or winding wires are hooked on the auxiliary hooking portions 83*b* so that the winding wires are connected to the commutator 81. In other words, the winding wires may be connected to the commutator 81 by at least either one of the connecting terminals 84*a* and the auxiliary hooking portions 83*b*.

In the above embodiment, the insulator 32 is arranged between the connection portions 35*a* and 35*b* that are adjacent in the lamination direction. Alternatively, the insulator may be eliminated and a gap may be formed between the connection portions that are adjacent in the lamination direction. In this case, the gap prevents the adjacent connection portions in the lamination direction from being short-circuited. Further, in the above embodiment, the insulator 32 is arranged between the connection portions 35*a* and 35*b* that are adjacent in the circumferential direction. Alternatively, the insulator may be eliminated so and a gap may be formed between the connection portions that are adjacent in the circumferential direction. In this case, the gap prevents the adjacent connection portions in the circumferential direction from being short-circuited.

In addition to the insulator 32, the short-circuiting member Sb of the above embodiment may further include an interval maintaining member for maintaining the interval between the adjacent connection portions 35*a* and 35*b* in the lamination direction.

Figure 18:
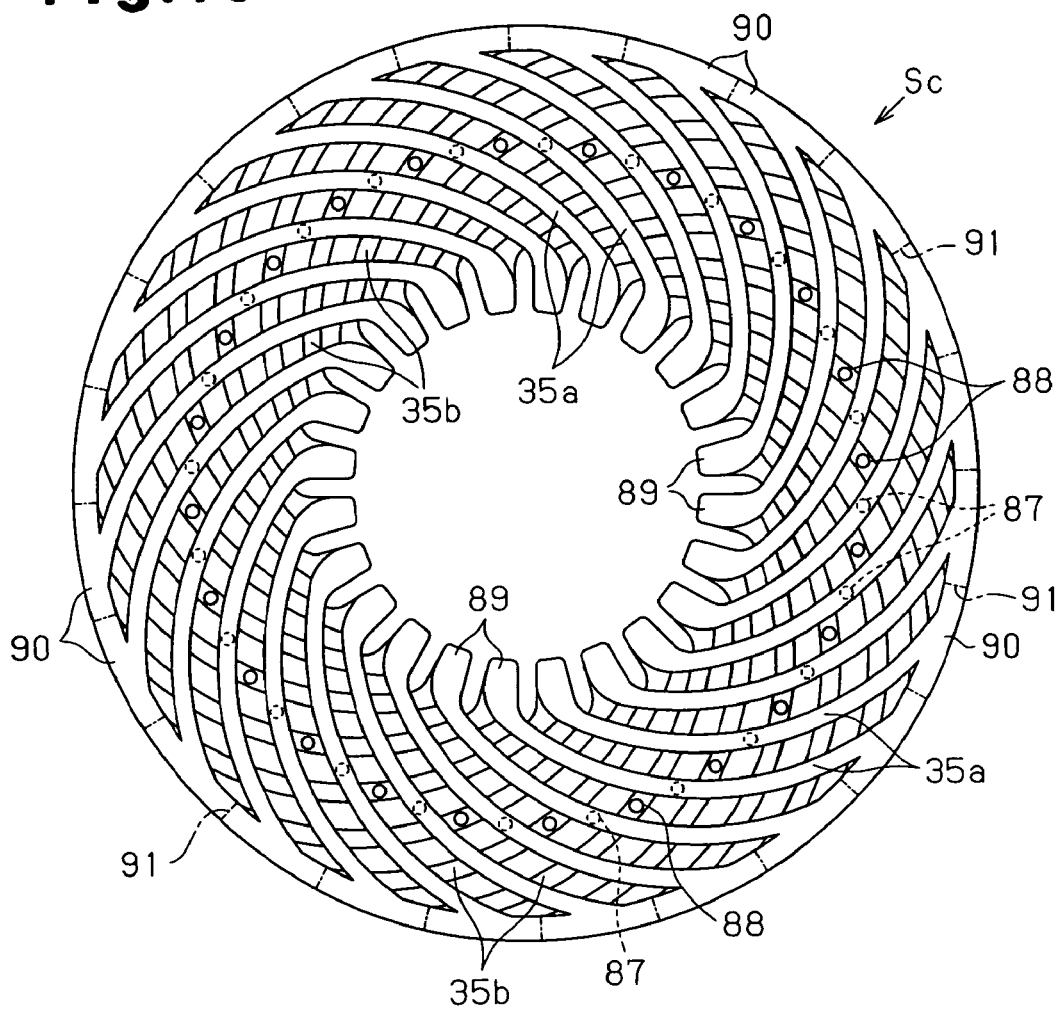
FIG. 18 is an explanatory diagram for describing a short-circuiting member according to a sixth modification of the present invention.
Figure 19:
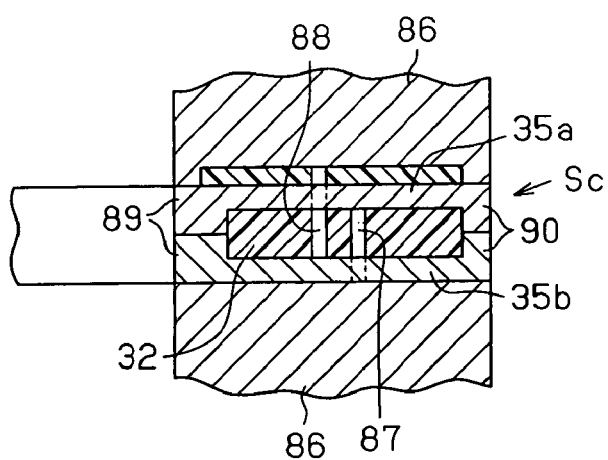
FIG. 19 is an explanatory diagram for describing a manufacturing method for the short-circuiting member of FIG. 18.

For example, as shown in FIGS. 18 and 19, interval maintaining members 87 and 88 for maintaining the interval between the adjacent connection portions 35*a* and 35*b* in the lamination direction (axial direction) are arranged in a mold 86 (refer to FIG. 19) in the insulator filling process (before a resin material is filled). In this state, the insulator (molten insulating resin material) 32 is filled. The interval maintaining members 87 and 88 are arranged to come in contact with the facing surfaces of the connection portions 35*a* and 35*b* and come in contact with the mold 86 through a gap in the circumferential direction that is formed between the facing connection portions 35*a* and 35*b*. This prevents the connection portions 35*a* and 35*b* from being bent in the lamination direction (axial direction) by the pressure of the insulator 32 (molten insulating resin material) that is filled so that the connection portions 35*a* and 35*b* are prevented from being short-circuited. FIGS. 18 and 19 show one example of a short-circuiting member Sc in which the hooking portions 36*a* and 36*b* are not formed. FIG. 18 shows the short-circuiting member Sc in a state before the insulator 32 is formed. FIG. 19 schematically shows a cross-section of the connection portions 35*a* and 35*b* to facilitate description of the manufacturing method. In this example, the inner side connection portion 51 and the outer side connection portion 52 are not formed in each conductive plate member in the punching process. However, in the punching process according to this modification, the conductive plate members are punched out in a manner that outer circumference terminal connection portions 91 (indicated by broken lines in FIG. 18), functioning as shaping-stage connection portions for connecting the outer sides of the connection portions 35*a* and 35*b* in the radial direction, are formed. Thus, inner circumference terminals 89 are spaced from one another in the circumferential direction, and outer circumference terminals 90 are not spaced from one another in the circumferential direction. In this modification, in a state in which the outer circumference terminal connecting portions 91 have been formed and the segments of the commutator main body are not spaced from one another in the circumferential direction, a cylindrical conductive plate member (a conductive plate member for forming segments) is arranged on the outer circumference of the segments. Afterwards, the outer circumference terminals 90 and the outer circumference terminal connection portions 91 are fixed to the cylindrical conductive plate member through welding or the like so that the short-circuiting member Sc and the commutator main body are fixed to each other. Then, the cylindrical conductive plate member is cut into separate parts in the circumferential direction so that the plurality of segments are formed. Further, the outer circumference terminal connection portions 91 are cut so that the outer circumference terminals 90 are spaced from one another in the circumferential direction. As a result, an undercut process, in which the cylindrical conductive plate member is cut into separate parts in the circumferential direction to form the segments, and a removing process, in which the outer circumference terminal connection portions 91 are removed, are performed at the same time. In other words, the segments are formed and the outer circumference terminal connection portions 91 are removed in a single process. This reduces the number of manufacturing processes of the commutator and reduces the manufacturing cost of the commutator. Further, in this modification, hooking portions may be formed at the ends of the commutator main body opposite to its ends to which the short-circuiting member Sc is fixed. In this case, the commutator main body may be used as a commutator that does not require the short-circuiting member Sc (that does not short-circuit).

In the commutator S of the above embodiment, twenty-four segments (segments 1 to 24) are short-circuited at an interval of 120 degrees. However, the number of segments and the angular interval at which the segments are short-circuited may be changed.

Figure 20:
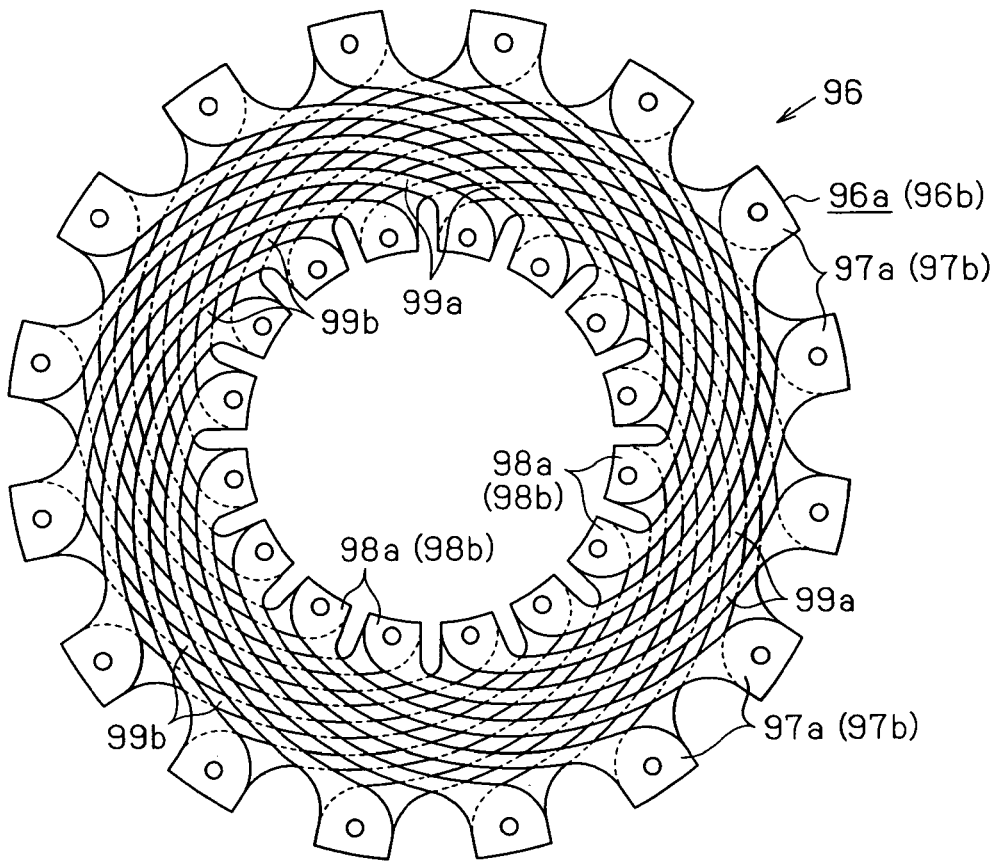
FIG. 20 is an explanatory diagram for describing a short-circuiting member according to a seventh modification of the present invention.
Figure 21:
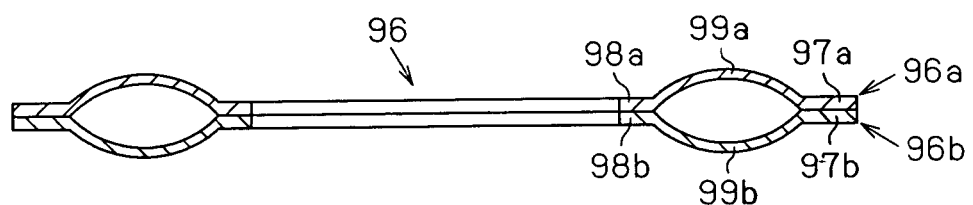
FIG. 21 is a schematic cross-sectional diagram showing a cross-section of the short-circuiting member of FIG. 20.

For example, the commutator may include 16 segments that are short-circuited at an interval of 180 degrees as shown in FIGS. 20 and 21. More specifically, the short-circuiting member 96 includes two components 96*a* and 96*b* that are arranged in the same plane and include 16 outer circumference terminals 97*a* and 97*b*, sixteen inner circumference terminals 98*a* and 98*b*, and sixteen connection portions 99*a* and 99*b*. Each of the connection portions 99*a* and 99*b* connects one of the outer circumference terminals 97*a* and 97*b* and one of the inner circumference terminals 98*a* and 98*b* separated from one another by 90 degrees in the circumferential direction.

In this example, the connection portions 99*a* and 99*b* are curved in the axial direction and thereby spaced from each other as shown in FIG. 21 so that the connection portions 99a and 99b do not come in contact with each other. FIGS. 20 and 21 do not show an insulator for filling each gap, and FIG. 21 schematically shows the cross-section of the connection portions 99a and 99b to facilitate understanding. In this example, the outer circumference terminals 97a and 97b, the inner circumference terminals 98a and 98b, and the connection portions 99a and 99b all have the same thickness. In other words, the connection portions 99a and 99b are curved and thereby spaced from each other in this example so that each of the components 96a and 96b can be formed to have a uniform thickness (each of the components 96a and 96b does not need to be processed to have a partially different thickness). The first and second components 96a and 96b may easily be obtained from a plate member having uniform thickness.

Figure 22:
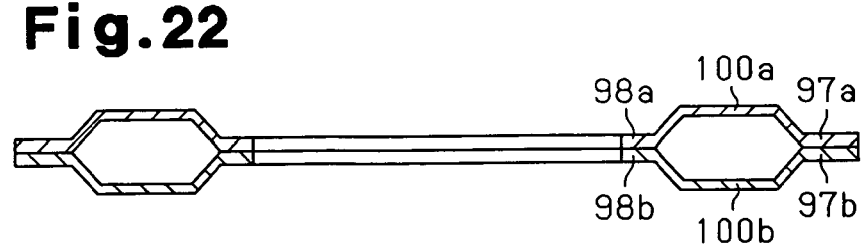
FIG. 22 is a schematic cross-sectional diagram showing a cross-section of a short-circuiting member according to an eighth modification of the present invention.

The connection portions 99a and 99b of the above modification may be modified to connection portions 100a and 100b that are bent (folded) in the axial direction and are thereby spaced from each other so that the connection portions 100a and 100b do not come in contact with each other as shown in FIG. 22.

In the above embodiment, the connection portions 35a and 35b are thinner than the outer circumference terminals 33a and 33b and the inner circumference terminals 34a and 34b (the stepped portions D are formed in the connection portions 35a and 35b). Alternatively, the thickness of the connection portions may be the same as the thickness of the outer circumference terminals 33a and 33b and the inner circumference terminals 34a and 34b (without the stepped portions being formed), and an insulating paper may be interposed between the adjacent connection portions in the lamination direction.

In the above embodiment, the positioning recess 27 is formed in the main body insulator H, and the positioning projection 32a is formed in the insulator 32. However, the shape of the positioning recess 27 and the shape of the positioning projection 32a may be changed as long as the positioning recess 27 and the positioning projection 32a enable the positioning of the first and second components in the circumferential direction. Further, the positioning recess 27 and the positioning projection 32a may be eliminated.

In the above embodiment, the fitting recesses 37a, 37b, 38a, and 38b and the fitting projections 39a, 39b, 40a, and 40b are formed alternately in the circumferential direction in the outer circumference terminals 33a and 33b and the inner circumference terminals 34a and 34b. Alternatively, the fitting recesses and the fitting projections may be formed only in the outer circumference terminals 33a and 33b or only in the inner circumference terminals 34a and 34b. Further, the fitting recesses may be formed in all of the inner circumference terminals and the outer circumference terminals included in either one of the first and second components, and the fitting projections may be formed in all the inner circumference terminals and the outer circumference terminals included in the other one of the first and second components. In this case, the shape of one of the two components slightly differs from the shape of the other one of the two components. However, the two components can be easily manufactured with the manufacturing apparatus used in the above embodiment (although the die used in the first and second punching operation units 54 and 55 needs to be changed partially). Further, the outer circumference terminals and the inner circumference terminals may be fixed to each other through welding or the like to eliminate the need for the fitting recesses 37a, 37b, 38a, and 38b and the fitting projections 39a, 39b, 40a, and 40b.

In the above embodiment, each of the connection portions 35a and 35b is formed along an involute curve. However, each of the connection portions 35a and 35b may be formed along another curve or may have a simple linear shape.

In the above embodiment, the recesses 25 are formed in the ends of the segments 1 to 24, and the hooking portions 36a and 36b are fitted and fixed to the pair of arms 25a that form the recess 25. Alternatively, the hooking portions 36a and 36b may be fixed to the segments 1 to 24 (recess 25) through, for example, welding.

In the above embodiment, the punching process is performed by each of the first and second punching operation units 54 and 55 so that the connection portions 35a and 35b are formed reversed from each other. Alternatively, the punching process may be performed by a single punching operation unit, and the lamination process may be performed in a manner that one of the two conductive plate members 53 is turned around to reverse the connection portions 35a and 35b with respect to each other.

The invention claimed is:

1. A short-circuiting member comprising:
    a plurality of components, each having an outer circumference and an inner circumference, and each of the plurality of components including:
        a plurality of outer circumference terminals arranged along the outer circumference;
        a plurality of inner circumference terminals arranged along the inner circumference; and
        a plurality of connection portions, each connecting a corresponding one of the outer circumference terminals and a corresponding one of the inner circumference terminals with the connection portions separated from each other by a predetermined angle in a circumferential direction, wherein:
    the plurality of outer circumference terminals, the plurality of inner circumference terminals, and the plurality of connection portions are substantially formed along the same plane;
    the plurality of components are laminated in a state in which the connection portions of one of the plurality of components are reversed to the connection portions of another one of the plurality of components; and
    the outer circumference terminals that are adjacent in a lamination direction are in contact with each other, the surfaces of the inner circumference terminals that are adjacent in the lamination direction are in contact with each other, and the connection portions that are adjacent in the lamination direction are not in contact with each other.

2. A short-circuiting member comprising:
    a plurality of components, each having an outer circumference and an inner circumference, and each of the plurality of components including:
        a plurality of outer circumference terminals arranged along the outer circumference;
        a plurality of inner circumference terminals arranged along the inner circumference; and
        a plurality of connection portions, each connecting a corresponding one of the outer circumference terminals and a corresponding one of the inner circumference terminals with the connection portions separated from each other by a predetermined angle in a circumferential direction, wherein:
    the plurality of outer circumference terminals, the plurality of inner circumference terminals, and the plurality of connection portions are substantially formed along the same plane;

the plurality of components are laminated in a state in which the connection portions of one of the plurality of components are reversed to the connection portions of another one of the plurality of components; and the outer circumference terminals that are adjacent in a lamination direction are in contact with each other, the inner circumference terminals that are adjacent in the lamination direction are in contact with each other, and the connection portions that are adjacent in the lamination direction are not in contact with each other, wherein:

the adjacent connection portions are bent or curved in the lamination direction so as to be spaced from each other.

3. A short-circuiting member comprising:

a plurality of components, each having an outer circumference and an inner circumference, and each of the plurality of components including:

a plurality of outer circumference terminals arranged along the outer circumference;

a plurality of inner circumference terminals arranged along the inner circumference; and a plurality of connection portions, each connecting a corresponding one of the outer circumference terminals and a corresponding one of the inner circumference terminals with the connection portions separated from each other by a predetermined angle in a circumferential direction, wherein:

the plurality of outer circumference terminals, the plurality of inner circumference terminals, and the plurality of connection portions are substantially formed along the same plane;

the plurality of components are laminated in a state in which the connection portions of one of the plurality of components are reversed to the connection portions of another one of the plurality of components; and the outer circumference terminals that are adjacent in a lamination direction are in contact with each other, the inner circumference terminals that are adjacent in the lamination direction are in contact with each other, and the connection portions that are adjacent in the lamination direction are not in contact with each other, wherein:

each of the plurality of connection portions is thinner than the outer circumference terminals and the inner circumference terminals in the lamination direction.

4. The short-circuiting member according to claim 3, further comprising:

an interval maintaining member for maintaining an interval between the adjacent connection portions.

5. The short-circuiting member according to claim 4, wherein:

the short-circuiting member further including an insulator arranged between the adjacent connection portions; and the insulator includes a positioning portion for positioning the plurality of components in the circumferential direction.

6. The short-circuiting member according to claim 1, wherein:

each of the plurality of connection portions is formed along an involute curve.

7. A short-circuiting member comprising:

a plurality of components, each having an outer circumference and an inner circumference, and each of the plurality of components including:

a plurality of outer circumference terminals arranged along the outer circumference;

a plurality of inner circumference terminals arranged along the inner circumference; and a plurality of connection portions, each connecting a corresponding one of the outer circumference terminals and a corresponding one of the inner circumference terminals with the connection portions separated from each other by a predetermined angle in a circumferential direction, wherein:

the plurality of outer circumference terminals, the plurality of inner circumference terminals, and the plurality of connection portions are substantially formed along the same plane;

the plurality of components are laminated in a state in which the connection portions of one of the plurality of components are reversed to the connection portions of another one of the plurality of components; and the outer circumference terminals that are adjacent in a lamination direction are in contact with each other, the inner circumference terminals that are adjacent in the lamination direction are in contact with each other, and the connection portions that are adjacent in the lamination direction are not in contact with each other, wherein:

at least either one of the plurality of outer circumference terminals and the plurality of inner circumference terminals include fitting recesses and fitting projections that are formed alternately in the circumferential direction.

8. The short-circuiting member according to claim 7, wherein:

the fitting recesses and the fitting projections are formed in a substantially middle part of the plurality of outer circumference terminals or the plurality of inner circumference terminals.

9. A commutator comprising:

the short-circuiting member according to claim 1; and a plurality of segments connected to the plurality of outer circumference terminals or the plurality of inner circumference terminals.

10. A commutator comprising:

a short-circuiting member comprising:

a plurality of components, each having an outer circumference and an inner circumference, and each of the plurality of components including:

a plurality of outer circumference terminals arranged alone the outer circumference;

a plurality of inner circumference terminals arranged along the inner circumference; and a plurality of connection portions, each connecting a corresponding one of the outer circumference terminals and a corresponding one of the inner circumference terminals with the connection portions separated from each other by a predetermined angle in a circumferential direction, wherein:

the plurality of outer circumference terminals, the plurality of inner circumference terminals, and the plurality of connection portions are substantially formed along the same plane;

the plurality of components are laminated in a state in which the connection portions of one of the plurality of components are reversed to the connection portions of another one of the plurality of components; and the outer circumference terminals that are adjacent in a lamination direction are in contact with each other, the inner circumference terminals that are adjacent in the lamination direction are in contact with each other, and the connection portions that are adjacent in the lamination direction are not in contact with each other; and a plurality of segments connected to the plurality of outer circumference terminals or the plurality of inner circumference terminals, wherein:
the plurality of segments form a substantially cylindrical shape, and the commutator main body is formed at an inner side of the plurality of segments and has an accommodation portion for accommodating the short-circuiting member, wherein:
the plurality of segments form a substantially cylindrical shape, and the commutator main body is formed at an inner side of the plurality of segments and has an accommodation portion for accommodating the short-circuiting member, and wherein:
the plurality of segments each have a recess formed in an end of the segment;
the plurality of outer circumference terminals each have a projection insertable in the corresponding recess; and
the short-circuiting member is arranged at an end of the commutator main body in a state in which the projections of the outer circumference terminals are inserted in the recesses of the segments.

11. A commutator comprising:
a short-circuiting member comprising:
a plurality of components, each having an outer circumference and an inner circumference, and each of the plurality of components including:
a plurality of outer circumference terminals arranged along the outer circumference;
a plurality of inner circumference terminals arranged along the inner circumference; and
a plurality of connection portions, each connecting a corresponding one of the outer circumference terminals and a corresponding one of the inner circumference terminals with the connection portions separated from each other by a predetermined angle in a circumferential direction, wherein:
the plurality of outer circumference terminals, the plurality of inner circumference terminals, and the plurality of connection portions are substantially formed along the same plane;
the plurality of components are laminated in a state in which the connection portions of one of the plurality of components are reversed to the connection portions of another one of the plurality of components; and
the outer circumference terminals that are adjacent in a lamination direction are in contact with each other, the inner circumference terminals that are adjacent in the lamination direction are in contact with each other, and the connection portions that are adjacent in the lamination direction are not in contact with each other; and
a plurality of segments connected to the plurality of outer circumference terminals or the plurality of inner circumference terminals, wherein:
the plurality of segments form a substantially cylindrical shape, and the commutator main body is formed at an inner side of the plurality of segments and has an accommodation portion for accommodating the short-circuiting member, wherein:
the plurality of segments form a substantially cylindrical shape, and the commutator main body is formed at an inner side of the plurality of segments and has an accommodation portion for accommodating the short-circuiting member, and wherein:
the plurality of segments each have a recess formed in an end of the segment and include a pair of arms;
the plurality of outer circumference terminals includes a hooking portion, projecting through the corresponding recess, for hooking a winding wire; and
each hooking portion is fixed by bending together the pair of arms of the corresponding recess.

12. A commutator comprising:
a short-circuiting member comprising:
a plurality of components, each having an outer circumference and an inner circumference, and each of the plurality of components including:
a plurality of outer circumference terminals arranged along the outer circumference;
a plurality of inner circumference terminals arranged along the inner circumference; and
a plurality of connection portions, each connecting a corresponding one of the outer circumference terminals and a corresponding one of the inner circumference terminals with the connection portions separated from each other by a predetermined angle in a circumferential direction, wherein:
the plurality of outer circumference terminals, the plurality of inner circumference terminals, and the plurality of connection portions are substantially formed along the same plane;
the plurality of components are laminated in a state in which the connection portions of one of the plurality of components are reversed to the connection portions of another one of the plurality of components; and
the outer circumference terminals that are adjacent in a lamination direction are in contact with each other, the inner circumference terminals that are adjacent in the lamination direction are in contact with each other, and the connection portions that are adjacent in the lamination direction are not in contact with each other; and
a plurality of segments connected to the plurality of outer circumference terminals or the plurality of inner circumference terminals, wherein:
the plurality of segments form a substantially cylindrical shape, and the commutator main body is formed at an inner side of the plurality of segments and has an accommodation portion for accommodating the short-circuiting member, wherein:
the plurality of segments form a substantially cylindrical shape, and the commutator main body is formed at an inner side of the plurality of segments and has an accommodation portion for accommodating the short-circuiting member, and wherein:
the plurality of outer circumference terminals each come in contact with an inner circumference of the corresponding segment.

* * * * *